United States Patent
Taylor et al.

(10) Patent No.: US 10,218,939 B2
(45) Date of Patent: *Feb. 26, 2019

(54) METHODS AND SYSTEMS FOR EMPLOYING VIRTUAL SUPPORT REPRESENTATIVES IN CONNECTION WITH MUTLI-PANE VIDEO COMMUNICATIONS

(71) Applicant: ALEXANDER MACKENZIE & PRANGER, Sandy, UT (US)

(72) Inventors: Jed W Taylor, South Jordan, UT (US); Eugene Patrick Pranger, Alpine, UT (US); Timothy Eugene Pranger, Eagle Mountain, UT (US)

(73) Assignee: POPIO IP HOLDINGS, LLC, Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/793,806

(22) Filed: Oct. 25, 2017

(65) Prior Publication Data

US 2018/0048865 A1    Feb. 15, 2018

Related U.S. Application Data

(63) Continuation-in-part of application No. 15/498,290, filed on Apr. 26, 2017, which is a continuation of
(Continued)

(51) Int. Cl.
*G06F 3/14* (2006.01)
*H04N 7/14* (2006.01)
(Continued)

(52) U.S. Cl.
CPC .......... *H04N 7/147* (2013.01); *G06F 3/0488* (2013.01); *G06F 3/04842* (2013.01);
(Continued)

(58) Field of Classification Search
CPC combination set(s) only.
See application file for complete search history.

(56) References Cited

U.S. PATENT DOCUMENTS

D619,593 S     7/2010  Fujioka et al.
7,812,988 B2  10/2010  Doo
(Continued)

FOREIGN PATENT DOCUMENTS

EP         2833595 A1      2/2015
WO    WO 2017/180226     10/2017

OTHER PUBLICATIONS

International Search Report & Written Opinion as received in PCTUS2017-016584 dated Apr. 25, 2017.
(Continued)

*Primary Examiner* — Phung-Hoang J Nguyen
(74) *Attorney, Agent, or Firm* — Keller Jolley Preece

(57) ABSTRACT

Systems and methods are disclosed for establishing a video connection between a mobile device and a support terminal while enabling the support terminal to concurrently push display elements to the mobile device through a separate connection. In particular, in one or more embodiments, the disclosed systems and methods establish a first connection between the support terminal and the mobile device and conduct a video chat between the devices transmitted through the first connection. The disclosed systems and methods enable the support terminal to push a display element to the mobile device through a second connection. In response to receiving the display element, the disclosed systems and methods divide the display screen of the mobile device into at least a first pane and a second pane, providing the video chat for display on the first pane and the display element for display on the second pane.

20 Claims, 18 Drawing Sheets

Related U.S. Application Data application No. 15/208,576, filed on Jul. 12, 2016, now Pat. No. 9,699,406, which is a continuation-in-part of application No. 29/561,280, filed on Apr. 14, 2016.

(51) Int. Cl.
| | |
|---|---|
| H04N 7/15 | (2006.01) |
| G06Q 10/10 | (2012.01) |
| G06Q 20/04 | (2012.01) |
| G06Q 20/32 | (2012.01) |
| G06Q 40/02 | (2012.01) |
| H04L 29/06 | (2006.01) |
| H04N 5/232 | (2006.01) |
| G06F 3/0484 | (2013.01) |
| G06F 3/0488 | (2013.01) |

(52) U.S. Cl.
CPC .......... *G06F 3/1446* (2013.01); *G06F 3/1454* (2013.01); *G06Q 10/10* (2013.01); *G06Q 20/042* (2013.01); *G06Q 20/3223* (2013.01); *G06Q 40/02* (2013.01); *H04L 65/1069* (2013.01); *H04N 5/232* (2013.01); *H04N 5/23254* (2013.01); *H04N 5/23293* (2013.01); *H04N 7/14* (2013.01); *H04N 7/15* (2013.01); *G06F 2203/04803* (2013.01); *G09G 2370/022* (2013.01)

(56) References Cited

U.S. PATENT DOCUMENTS

| | | | |
|---|---|---|---|
| 8,117,562 | B2 | 2/2012 | Getsch |
| D670,716 | S | 11/2012 | Majeed et al. |
| D700,912 | S | 3/2014 | Kim |
| 8,782,043 | B2 | 7/2014 | Chisholm et al. |
| 8,890,685 | B1 | 11/2014 | Sookman et al. |
| 8,924,465 | B1 | 12/2014 | Tunguz-Zawislak |
| 8,955,743 | B1 | 2/2015 | Block et al. |
| D725,133 | S | 3/2015 | Smirin et al. |
| D725,665 | S | 3/2015 | Tseng et al. |
| D726,736 | S | 4/2015 | Smirin et al. |
| D739,867 | S | 9/2015 | Faria et al. |
| D747,733 | S | 1/2016 | Scalisi |
| 9,245,100 | B2 * | 1/2016 | Marco ............... G06F 21/32 |
| D755,812 | S | 5/2016 | Lim |
| D759,662 | S | 6/2016 | Panjabi |
| D760,259 | S | 6/2016 | Watson |
| D762,231 | S | 7/2016 | Pearson |
| D762,676 | S | 8/2016 | Lim |
| D762,686 | S | 8/2016 | Lee et al. |
| D763,872 | S | 8/2016 | Tussy |
| D765,683 | S | 9/2016 | Peng |
| D767,601 | S | 9/2016 | Zhou |
| D768,148 | S | 10/2016 | Jung et al. |
| D769,921 | S | 10/2016 | Smith |
| D770,487 | S | 11/2016 | Li |
| D770,488 | S | 11/2016 | Li |
| D774,061 | S | 12/2016 | Wu |
| D776,147 | S | 1/2017 | Simmons et al. |
| D777,733 | S | 1/2017 | Loosli et al. |
| D779,540 | S | 2/2017 | Rad et al. |
| D780,787 | S | 3/2017 | Gomez |
| D781,311 | S | 3/2017 | Rad et al. |
| D781,874 | S | 3/2017 | Dunn |
| D789,389 | S | 6/2017 | Kim et al. |
| D789,395 | S | 6/2017 | Weeresinghe |
| D789,956 | S | 6/2017 | Ortega et al. |
| D790,578 | S | 6/2017 | Hatzikostas |
| 9,699,406 | B1 | 7/2017 | Pranger et al. |
| D793,427 | S | 8/2017 | Sun |
| D797,118 | S | 9/2017 | Van Every et al. |
| D803,851 | S | 11/2017 | Vazquez |
| 9,820,085 | B1 | 11/2017 | Telang et al. |
| 2005/0149630 | A1* | 7/2005 | Smolinski ............... H04L 51/04 709/227 |
| 2006/0114315 | A1 | 6/2006 | Crook |
| 2006/0152594 | A1* | 7/2006 | Landschaft ............ H04N 7/185 348/211.99 |
| 2007/0067267 | A1 | 3/2007 | Ives |
| 2007/0093241 | A1 | 4/2007 | Oh et al. |
| 2008/0075067 | A1 | 3/2008 | Guglielmi et al. |
| 2009/0313167 | A1 | 12/2009 | Dujari et al. |
| 2010/0053302 | A1 | 3/2010 | Ivashin et al. |
| 2012/0017149 | A1 | 1/2012 | Lai et al. |
| 2012/0030741 | A1 | 2/2012 | Chai et al. |
| 2012/0251985 | A1* | 10/2012 | Steels ................ G09B 5/00 434/156 |
| 2012/0296747 | A1 | 11/2012 | Triola |
| 2013/0083066 | A1 | 4/2013 | Aoki et al. |
| 2013/0203345 | A1* | 8/2013 | Fisher ................. H04B 11/00 455/41.1 |
| 2014/0022328 | A1* | 1/2014 | Gechter ............... G06Q 30/06 348/14.02 |
| 2014/0051402 | A1* | 2/2014 | Qureshi ............... H04M 3/5307 455/413 |
| 2014/0063174 | A1 | 3/2014 | Junuzovic et al. |
| 2014/0106721 | A1 | 4/2014 | Calman et al. |
| 2014/0214967 | A1 | 7/2014 | Baba et al. |
| 2015/0149536 | A1 | 5/2015 | Nishikawa et al. |
| 2015/0149565 | A1 | 5/2015 | Ahmed |
| 2015/0227298 | A1 | 8/2015 | Kim et al. |
| 2015/0234636 | A1 | 8/2015 | Barnes |
| 2015/0256695 | A1 | 9/2015 | Showering et al. |
| 2015/0304196 | A1 | 10/2015 | Sun et al. |
| 2015/0326729 | A1 | 11/2015 | Paolini-Subramanya |
| 2015/0334344 | A1 | 11/2015 | Shoemake et al. |
| 2015/0350446 | A1 | 12/2015 | Glass et al. |
| 2016/0006817 | A1 | 1/2016 | Mitic et al. |
| 2016/0100298 | A1 | 4/2016 | Peterson |
| 2016/0192308 | A1 | 6/2016 | Turney et al. |
| 2016/0212255 | A1 | 7/2016 | Lee et al. |
| 2016/0224210 | A1 | 8/2016 | Moore et al. |
| 2016/0300030 | A1* | 10/2016 | Vann, Jr. ............. G06F 19/3418 |
| 2016/0337424 | A1 | 11/2016 | Mandyam |
| 2016/0378744 | A1 | 12/2016 | XiangLi et al. |
| 2017/0017635 | A1* | 1/2017 | Leliwa ................ G06F 17/271 |
| 2017/0140504 | A1 | 5/2017 | Jeong et al. |
| 2017/0150223 | A9 | 5/2017 | Zaccone et al. |
| 2017/0171700 | A1 | 6/2017 | Sabarez et al. |
| 2017/0270079 | A1 | 9/2017 | Rajwat et al. |
| 2017/0302884 | A1 | 10/2017 | Pranger et al. |
| 2017/0313262 | A1 | 11/2017 | Wisnia et al. |
| 2017/0366353 | A1* | 12/2017 | Struttmann ........... H04L 9/3236 |
| 2017/0368413 | A1* | 12/2017 | Shavit ................ A63B 24/0075 |
| 2018/0012432 | A1 | 1/2018 | Shin et al. |
| 2018/0018396 | A1 | 1/2018 | Roundtree et al. |
| 2018/0018838 | A1* | 1/2018 | Fankhauser ........ G07C 9/00087 |
| 2018/0035074 | A1 | 2/2018 | Barnes |
| 2018/0048864 | A1 | 2/2018 | Taylor et al. |
| 2018/0054446 | A1 | 2/2018 | Modras |
| 2018/0103341 | A1 | 4/2018 | Moiyallah et al. |
| 2018/0104573 | A1* | 4/2018 | Jeffery ................ A63F 13/211 |
| 2018/0176272 | A1 | 6/2018 | Zur et al. |
| 2018/0367755 | A1 | 12/2018 | Pranger et al. |

OTHER PUBLICATIONS

U.S. Appl. No. 15/208,576, Nov. 30, 2016, Office Action.
U.S. Appl. No. 15/208,576, Feb. 16, 2017, Office Action.
U.S. Appl. No. 15/208,576, May 8, 2017, Office Action.
U.S. Appl. No. 15/208,576, May 24, 2017, Notice of Allowance.
U.S. Appl. No. 15/498,290, Oct. 19, 2017, Office Action.
U.S. Appl. No. 29/561,280, Jan. 24, 2018, Restriction Requirement.
U.S. Appl. No. 15/498,290, Mar. 21, 2018, Office Action.
U.S. Appl. No. 15/498,290, Jul. 18, 2018, Notice of Allowance.
U.S. Appl. No. 15/792,040, Apr. 26, 2018, Office Action.
U.S. Appl. No. 29/561,280, Aug. 14, 2018, Office Action.

(56) References Cited

OTHER PUBLICATIONS

U.S. Appl. No. 15/498,290, Aug. 24, 2018, Notice of Allowance.

U.S. Appl. No. 15/792,040, Sep. 11, 2018, Office Action.
U.S. Appl. No. 15/792,040, Nov. 9, 2018, Notice of Allowance.

* cited by examiner

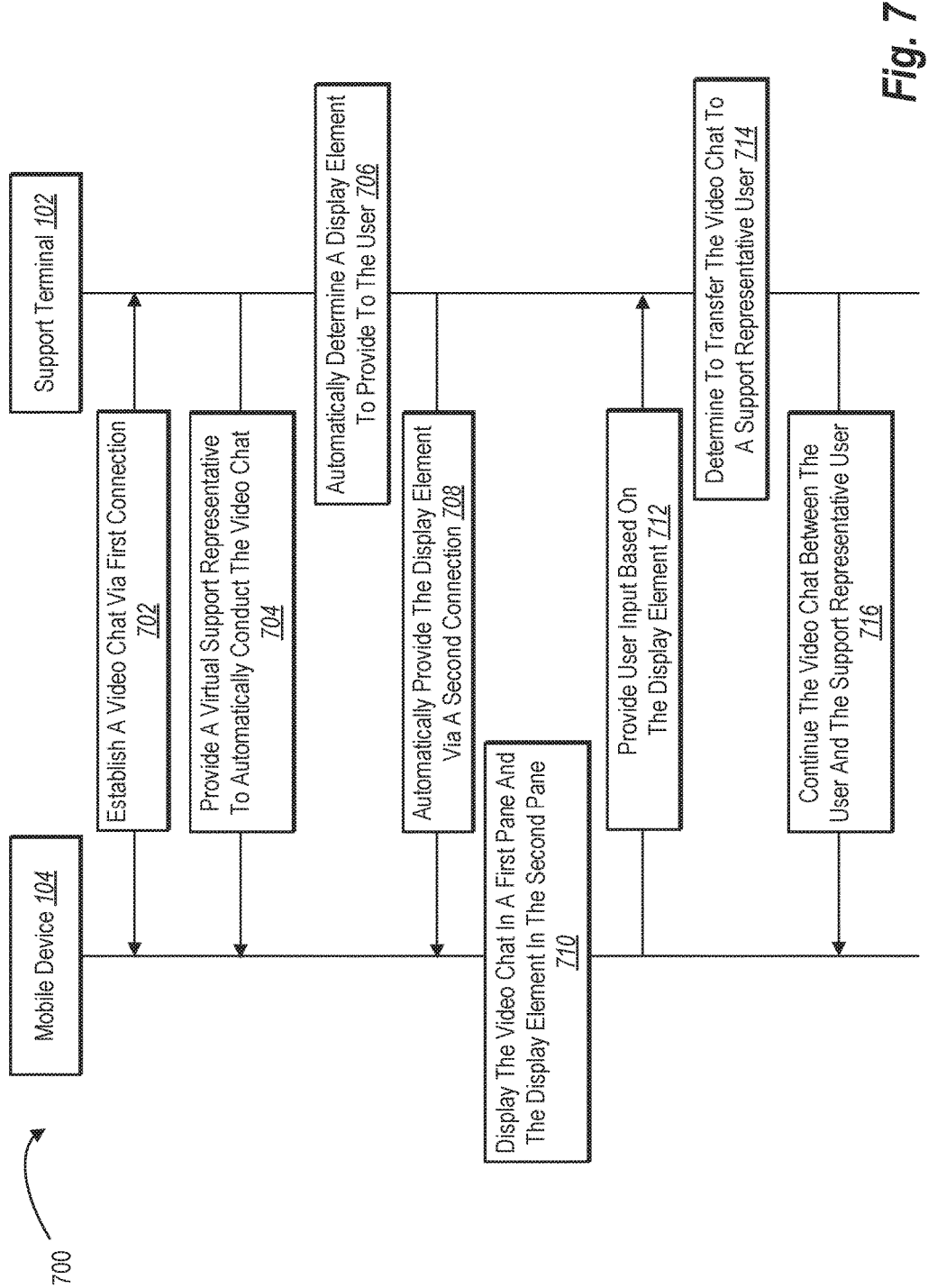

METHODS AND SYSTEMS FOR EMPLOYING VIRTUAL SUPPORT REPRESENTATIVES IN CONNECTION WITH MUTLI-PANE VIDEO COMMUNICATIONS

CROSS-REFERENCE TO RELATED APPLICATIONS

The present application is a continuation-in-part of U.S. patent application Ser. No. 15/498,290, filed on Apr. 26, 2017, which is a continuation of U.S. patent application Ser. No. 15/208,576, filed on Jul. 12, 2016 and now issued as U.S. Pat. No. 9,699,406, which is a continuation-in-part of U.S. patent application Ser. No. 29/561,280, filed on Apr. 14, 2016. Each of the aforementioned applications are hereby incorporated by reference in their entirety.

BACKGROUND

Many modern businesses create mobile applications meant to improve accessibility to the business and allow a user to perform some desired function or access information on a mobile device. Some businesses, such as game developers, do business solely through the application itself. Other businesses, such as banks, may create a mobile application merely to provide customers a convenient alternative to visiting a brick and mortar branch of the business.

A frequent problem arises when a user does not know how to perform a desired function or access information on the business's mobile application. New users and users not familiar with technology often run experience frustration when using mobile applications. This frustration may lead a user to abandon the mobile application and, possibly, the business-customer relationship altogether.

More specifically, problems associated with current mobile application technology that commonly add to a user's frustration include a lack of interpersonal communication between the user and a representative of the business. Because a mobile application may generally substitute for face-to-face interaction, a user may have little interaction with any people associated with the business, leading to disconnect between the user and the business. This disconnect can weaken the business-customer relationship.

Additional problems include the continued need for the user to be the principal navigator of the application. Though a user may seek assistance from a customer support agent ("agent") in interacting with the application, the agent is generally limited to orally providing instructions to the user. As a result, any rendered assistance fails to alleviate the burden of navigating the application from the user. If the user doesn't understand or cannot follow the instructions, frustration results.

Prior attempts to improve a user's experience have included tutorial slide shows or videos, help documents, guided tours of the site or application, or other similar attempts to familiarize the user with the offered functionality. These solutions, however, typically do not cover every function offered, overload the user with too much information at once, or offer a predetermined explanation with no elaboration if the user does not understand.

Other solutions, such as telephone support, requires the user to either use multiple devices to follow the representative's instructions while on the phone or to write down or memorize the instructions and perform them after the conversation has ended. This limits a user to seeking support only where multiple devices or writing materials are available. For example, often a user may be trying to use a mobile application on their mobile phone. Many mobile phones do not allow a user to talk on a phone call and navigate a mobile application at the same time. Thus, a phone call many not be sufficient to resolve the user's concerns.

Users may attempt to perform a video call or text chat session to obtain help with a mobile application. Again, some devices do not allow for simultaneous video chats and navigation of a mobile application. Furthermore, even if the devices allow for both, the use of two separate applications (the mobile application and a video chat application) require switching back and forth between the video call application and the mobile application, require large amounts of processing power to run both applications, or otherwise lead to a degraded experience.

SUMMARY

One or more embodiments described herein provide benefits and/or solve one or more of the foregoing or other problems in the art with systems and methods for establishing a video connection between a mobile device and a support terminal while also allowing the support terminal to push display elements through a separate connection to the mobile device. In particular, establishing a separate connection providing bi-directional capabilities between the mobile device and support terminal allows the support terminal to push elements directly to the mobile device while maintaining the video connection. Thus, rather than requiring a user of an application on the mobile device to navigate the application to find the display elements, the support terminal pushes these elements directly to the mobile device. In effect, the systems and methods allow a support terminal to remotely control the display of such elements on the mobile device.

Additionally, when the mobile device receives a display element, instructions stored on the mobile device execute, dividing the display of the mobile device into at least a first pane and a second pane. The first pane displays a video chat session and the second pane displays the display element. Thus, the user of the mobile device is able to maintain interpersonal communication with a user of the support terminal while reviewing and/or interacting with the display element/mobile application. In this way, a user of the mobile application is spared the hassle of using multiple devices or memorizing instructions when seeking help in navigating and using the application.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

The detailed description describes one or more embodiments with additional specificity and detail through the use of the accompanying drawings, as briefly described below.

FIG. 7 illustrates a sequence diagram of transferring a video chat from a virtual support representative to a support representative user in accordance with one or more embodiments.

DETAILED DESCRIPTION

Figure 1:
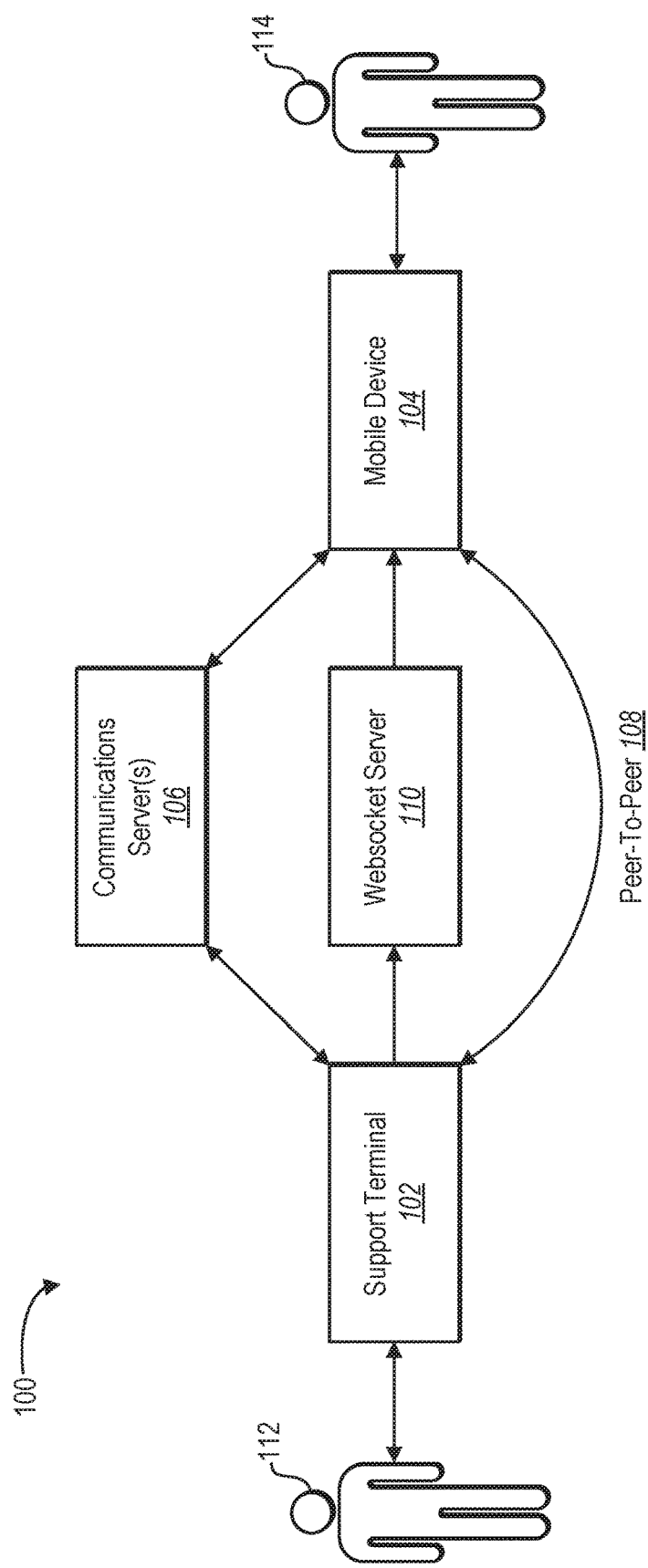
FIG. 1 illustrates a schematic diagram of a communications system in accordance with one or more embodiments.

One or more embodiments described herein include a communications system that enables a single mobile application to use multiple communication connections with a support terminal to provide a video chat while concurrently providing a display element pushed to the mobile device by the support terminal. To illustrate, a user of the mobile device accesses the communications system via the mobile application. In one or more embodiments, a user interface of the mobile application provides a selectable option to request assistance from a support representative (e.g., an actual or virtual support representative) via video chat. In response to the user request, the communications system establishes a video chat session between the mobile device and the support terminal. The video chat allows the user to communicate with a support representative using the support terminal and seek help in interacting with the mobile application.

During the video chat session, the communications system enables the support representative to assist by allowing the support terminal to push a display element to the mobile device. A display element may contain information to be viewed or a function to be performed at the mobile device. For example, the display element can include a video providing information about a particular service. Alternatively, the display element may contain an interactive feature, such as a Tillable form. In one or more embodiments, the communications system provides the display element on the mobile device while concurrently providing the video chat via a multi-pane display of the single mobile application. In this way, the user may receive further assistance while reviewing or interacting with the display element.

More particularly, the communications system initiates a video chat session by establishing a first connection between a mobile device and a support terminal. Once established, the communications system conducts a video chat transmitted through the first connection and provides the video chat for display to both the support terminal and the mobile device. A user of the mobile device and a support representative using the support terminal may then communicate with one another.

Additionally, one or more embodiments of the communications system enable the support terminal to push a display element to the mobile device. For example, in at least one embodiment, the support terminal selects a display element from a set of selectable display elements stored on the support terminal and subsequently pushes the display element to the mobile device. The communications system may transmit the display element to the mobile device through a second connection. For example, the communication system uses a second connection, separate from the first connection to send the display element. One will appreciate in light of the disclosure herein that the use of a separate connection allows the support terminal to push the display element, uses less computing resources, and avoids degrading the video chat.

In response to the mobile device receiving the display element, the mobile application divides a display of the mobile device into multiple panes (e.g., two or more panes). In at least one embodiment, the mobile application divides the display into at least a first pane and a second pane. The communications system then provides the video chat in the first pane while concurrently providing the display element in the second pane.

By concurrently providing a video chat and a display element, the communications system enables a support representative to more effectively guide a user of a mobile device through the entire process of interacting with a mobile application. In this way, the user avoids navigating an unfamiliar mobile application and, as a result, avoids possible frustration. Additionally, by using a connection that provides bi-directional communication, the support terminal provides the information or function directly to the mobile device. The bi-directional communication gives the communications system advantages over a more traditional system in which a client device polls a server for data. In such traditional systems, a server may not initiate communication with a mobile device, but may only respond to a request. Using a bi-directional connection, the communications system allows the support terminal to immediately provide an available display element to the mobile device, rather than wait for a request. Thus, one or more embodiments provide for quicker processing/sending of display elements to a mobile device.

Further, the mobile device displays the video chat and the display element concurrently using the same mobile application, and thus, requires fewer computer resources than a conventional system—such as memory, processing power, and display space—thus allowing a limited set of computer resources to perform functions faster than before. In particular, a user need not have a separate video chat application running together with the mobile application.

Though the discussion herein includes implementations of the methods and systems in the context of a mobile banking application, it will be appreciated that this context is merely illustrative and that the uses of the methods and systems described extend beyond a banking application to other non-banking mobile applications.

FIG. 1 illustrates an example implementation of a communications system 100 (or simply "system 100"). As illustrated in FIG. 1, the system 100 includes a support terminal 102, a mobile device 104, communication server(s) 106, a peer-to-peer connection 108, and a WebSocket server 110. As is also illustrated in FIG. 1, a support representative user 112 and a mobile device user 114 may interact with the support terminal 102 and the mobile device 104 respectively to access content on the respective devices and communicate with one another.

As shown in FIG. 1, the system 100 includes the support terminal 102. The support terminal 102 may include a computing device, such as those described below in relation to FIG. 11 For example, the support terminal 102 may include one or more personal computers, laptop computers, mobile devices, mobile phones, tablets, special purpose computers, televisions, or other computing devices.

The mobile device 104 may include any mobile computing device, such as those described below in relation to FIG. 11. In one or more embodiments, the mobile device 104 includes a handheld client device. As used herein the term "handheld device" refers to a device sized and configured to be held/operated by a single hand of a user. For example, the mobile device 104 can include a smartphone, a tablet computing device, or another mobile computing device.

Additionally, the system 100 also includes the communications server(s) 106. The communications server(s) 106 may store, receive, and transmit any type of data, including a display element, a video data, or a video chat request. For example, the communications server(s) 106 may receive and transmit a request for a video chat from the mobile device 104 to the support terminal 102. The communications server(s) 106 can also transmit video data between one or more devices, such as the support terminal 102 and the mobile device 104.

As illustrated, the communications server(s) 106 serves to establish a connection between the support terminal 102 and the mobile device 104. For example, the communications server(s) 106 may establish a connection in response to a video chat request sent by the mobile device 104. In particular, the communications server(s) 106 establish the connection to allow transmission of a video chat between the support terminal 102 and the mobile device 104. For example, once the communications server(s) 106 establishes the connection, the system 100 conducts a video chat between the support terminal 102 and the mobile device 104 through the connection. The support representative user 112 and the mobile device user 114 may interact with the support terminal 102 and the mobile device 104 respectively to communicate with one another via the video chat.

As illustrated, in one or more embodiments, the communication server(s) 106 includes one server. Alternatively, the communications server(s) 106 may include a series of servers. For example, the communications server(s) 106 may include a video load balanced server, a signaling server, and a STUN/TURN server. The video load balanced server serves to direct communications to an available support terminal, the signaling server notifies the available support terminal of a video chat request, and the STUN/TURN server serves to work through secure firewalls to establish the connection. Alternatively, any other combinations and types of servers sufficient to establish a connection may be used as part of the communication server(s) 106.

As illustrated, the system 100 also includes the peer-to-peer connection 108. The peer-to-peer connection 108 serves as a direct connection between the support terminal 102 and the mobile device 104. In one or more embodiments, the peer-to-peer connection 108 may serve to substitute the communication servers(s) 106. In particular, after the communication server(s) 106 establishes the connection between the support terminal 102 and the mobile device 104, the system 100 may subsequently establish the peer-to-peer connection 108 and conduct the video chat over the peer-to-peer connection. As used herein, a peer-to-peer (P2P) connection is created when two or more client computing devices are connected and share resources without going through a separate server computing device (like the communication server(s) 106).

The peer-to-peer connection 108 can provide a solution to bandwidth limitations that restrict the maximum number of concurrent video streams possible through the communication server(s) 106. The peer-to-peer connections, where possible, maximize the number of possible simultaneous video calls.

In one or more embodiments, the communication server(s) 106 may first determine if the peer-to-peer connection 108 is available. For example, the peer-to-peer connection 108 may be unavailable due to limitations or the configuration of the hardware or software within the system 100. For example, video relays between client devices on restrictive networks and firewalls are often blocked. Network address translation limits the client device's ability to have peer-to-peer connections. In one or more embodiments, the system detects when a peer-to-peer connection is not possible. If the communication server(s) 106 determines that the peer-to-peer connection 108 is not available, then the communications server(s) 106 may maintain (or reroute) the connection for the video chat via the communication servers(s) 106. In an alternative embodiment, the communications server(s) 106 may maintain the first connection whether or not the peer-to-peer connection 108 is available.

As is also illustrated in FIG. 1, the system 100 may also include the WebSocket server 110. The WebSocket server 110 may generate, store, receive, and transmit any type of data, including a display element (not shown). For example, the WebSocket server 110 may receive and push a display element sent from the support terminal 102 to the mobile device 104.

As FIG. 1 illustrates, the WebSocket server 110 provides a second connection between the support terminal 102 and the mobile device 104. In particular, the WebSocket server 110 provides a bi-directional connection, also known as a full-duplex connection, enabling support terminal 102 to push data to the mobile device 104, rather than requiring support terminal 102 to wait for a request from the mobile device 104, as is done in some traditional client/server systems. Though FIG. 1 illustrates an embodiment where the second connection is established through a WebSocket server 110, one with ordinary skill in the art will appreciate that any type of server or device that enables the support terminal 102 to push a display element to the mobile device 104 can be used as a substitute for the WebSocket server 110.

FIG. 1 further illustrates an embodiment where the second connection is a persistent connection, consistently maintained by the WebSocket server 110 after it has been established. A persistent second connection may be established before, after, or at the same time, the first connection is established. One or more embodiments of the system 100 may wait until the support terminal 102 initiates transmission of a first display element before it establishes the second connection through the WebSocket server 110. As an alternative to a persistent second connection, the system 100 may create the second connection through the WebSocket server 110 only when required to transmit data from the support terminal 102 to the mobile device 104. In this alternative embodiment, system 100 may wait until the support terminal 102 initiates transmission of data to the mobile device 104. When the transmission is initiated, the system 100 then creates the second connection through the WebSocket server 110, waits until the transmission terminates, and then severs the second connection.

In one or more embodiments, the support terminal 102 facilitates a virtual support representative interface that assists both users (e.g., the mobile device user 114) and support representative users (e.g., the support representative user 112). For example, the virtual support representative, automatically without intervention from a support representative user, exchanges communications with the mobile device user 114 using a virtual avatar or chat interface. In particular, as detailed below, the virtual support representative at the support terminal 102 is an automated bot that employs artificial intelligence (e.g., machine learning) along with knowledge bases, workflows, information pipelines, decision trees, templates and/or frameworks to provide relevant assistance and information to the mobile device user 114. Further, in some instances, the support terminal 102 determines to transfer the communications (e.g., video chat or text chat) from the virtual support representative to the support representative user 112, as described below.

Figure 2:
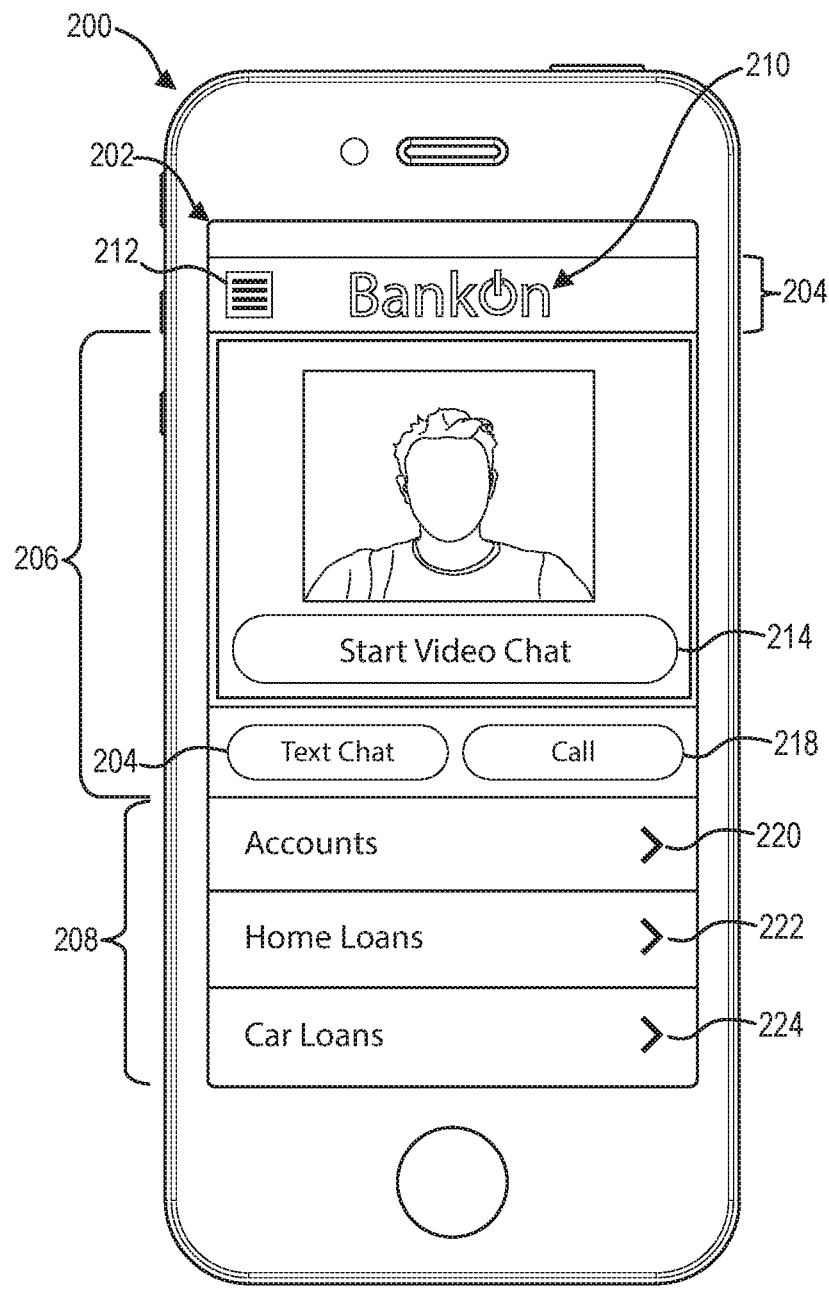
FIG. 2 illustrates a mobile device displaying an application user interface operable to enable a mobile device user to interact with a mobile application in accordance with one or more embodiments.

FIG. 2 illustrates a mobile device 200 displaying an application user interface 202 operable to allow a user (e.g., the mobile device user 114) to interact with the mobile application in accordance with one or more embodiments. The mobile device 200 can represent an embodiment of the mobile device 104 described above. In some embodiments, the mobile device 200 is a mobile phone or tablet device. Additional description regarding mobile devices is provided below in connection with FIG. 11. Further, while FIG. 2 illustrates a mobile device, the same techniques and operations can be performed on an equivalent application hosted on a client device, such as a laptop computer.

As shown, the application user interface 202 includes a header portion 204, a customer support portion 206, and a navigation portion 208. In alternate embodiments, the application user interface 202 may include any other portions relevant to the mobile application. The header portion 204 of application user interface 202 provides general information and options for the user. As FIG. 2 illustrates, the header portion 204 includes a title 210 and a selectable menu element 212. The title 210 provides the text or a graphic, such as the title of a business. Alternatively, in some embodiments, the title 210 provides the name of the mobile application or any other title deemed sufficient for the purposes of the mobile application. The selectable menu element 212 provides a drop-down menu with pre-selected options for interacting with the mobile application. For example, the drop-down menu provides the user with an option of logging into a user account or navigating to a home page of the mobile application. In one or more alternative embodiments, selectable menu element 212 may be replaced with links in the header portion 204 providing the user with similar options.

The customer support portion 206 includes an option to contact a support representative to receive assistance. As mentioned above, the support representative can be a virtual support representative (e.g., an automated bot) or a support representative user (e.g., a human representative). For example, a user who is unfamiliar with a mobile application may need assistance in finding information or performing a desired function. By way of illustration, in the context of a mobile banking application, the user may require help in finding account balances, performing a check deposit, making a credit card payment, or interacting with the mobile application in another way.

As illustrated in FIG. 2, the customer support portion 206 includes multiple selectable buttons the user can select to contact a support representative. For example, the customer support portion 206 of FIG. 2 includes a video chat button 214, a text chat button 216, and a phone call button 218, which the mobile application may use to initiate a video chat, a text chat, or a phone call respectively. In response to a selection, the mobile device 200 sends a request to initiate a communications session of the type associated with the button. For example, by selecting the video chat button 214, the mobile device 200 sends a request to begin a video chat session with the support representative (e.g., a virtual support representative or support representative user).

Alternatively, the customer support portion 206 may include other selectable buttons to contact the support representative, such as an option to e-mail or send a voice-recorded message. It will also be appreciated that any number of selectable buttons may be present in the customer support portion 206 in any combination. To illustrate, the customer support portion 206 may include selectable buttons for video chat, text chat, phone call, and email message, or the customer support portion 206 may only include the video chat button 214.

The navigation portion 208 presents the user with quick navigational options. For example, the navigation portion 208 of FIG. 2 presents options to navigate to a page comprising information on accounts 220, information on home loans 222, or information on car loans 224. In one or more embodiments, other options deemed useful to the user may also be present.

Figure 3:
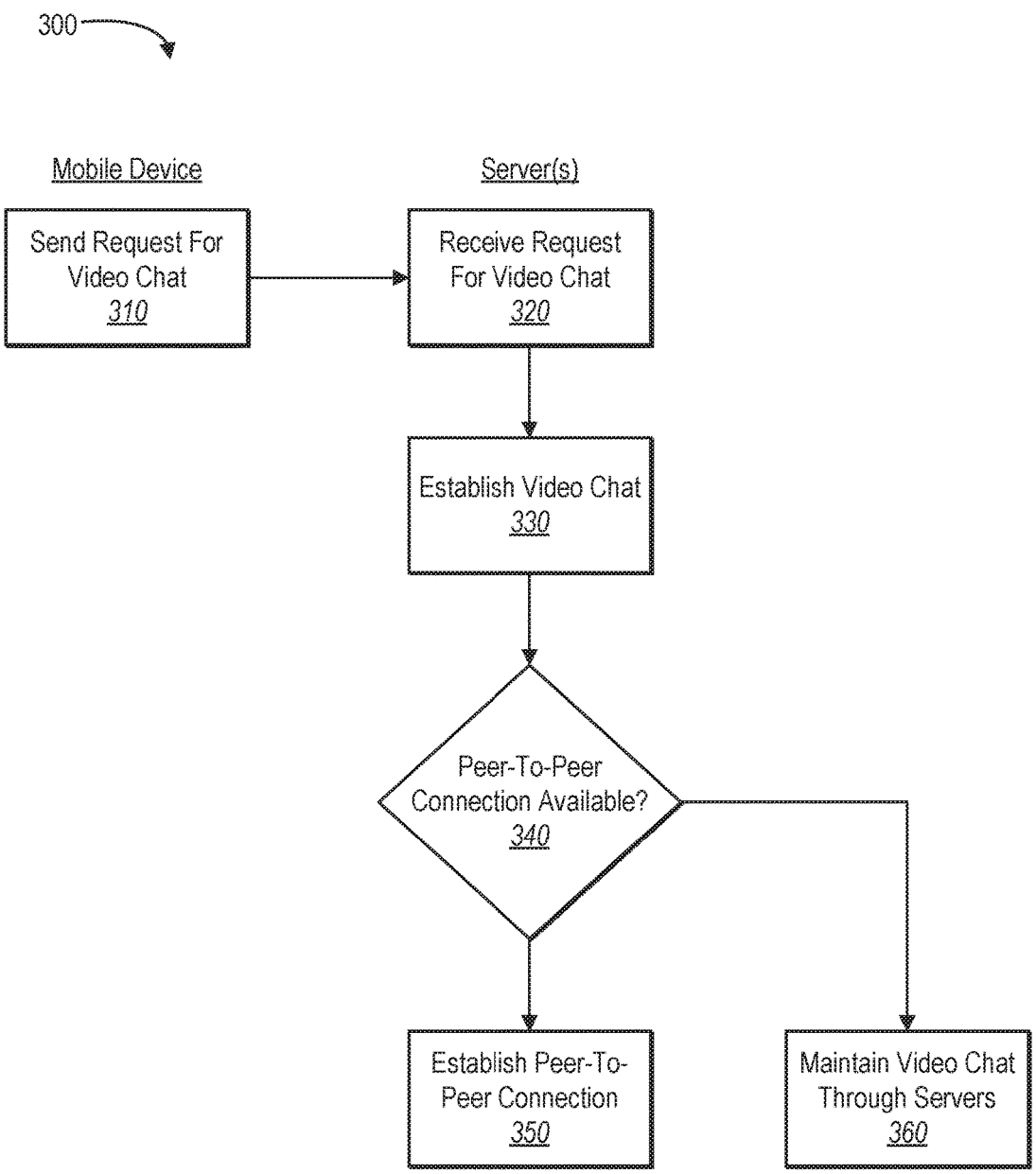
FIG. 3 illustrates a flowchart of a series of acts in a method of initiating a video chat connection between a mobile device and a support terminal in accordance with one or more embodiments.

As mentioned previously, one or more embodiments include a video chat between a mobile device and a support terminal. FIG. 3 illustrates a flowchart of a series of acts in a method 300 of initiating a video chat connection between a mobile device (e.g., mobile device 104) and a support terminal (e.g., support terminal 102) in accordance with one or more embodiments. The method 300 is intended to be illustrative of one or more methods in accordance with the present disclosure and is not intended to limit potential embodiments. Alternative embodiments can include additional, fewer, or different steps than those articulated in FIG. 3.

As illustrated in FIG. 3, the method 300 includes an act 310 of sending a request to initiate a video chat from a mobile device. In one or more embodiments, the request is tied to assistance with a particular good or service (e.g., account status, mobile check deposit, or loan application). In addition, the request can initially be processed by a series of one or more servers, such as the communication server(s) 106 of FIG. 1. As discussed above, the communication servers may contain a load balance server, a signaling server, and a STUN/TURN server. Alternatively, the request may be sent through a single server that performs the same functionality as the combination of servers. In particular, the act 310 includes sending a request from the mobile device to initiate a video chat between the mobile device and a support terminal 102.

Moreover, as illustrated in FIG. 3, the method 300 also includes an act 320 of a receiving the request to initiate a video chat. In some embodiments, the request indicates whether the user desires to chat with a virtual support representative (e.g., directly or if a support representative user ins not immediately available). In alternative embodiments, the request indicates that the user desires to video chat directly with a support representative user. Whether the request includes a particular support representative type may partially depend on the product or service for which the user is requesting assistance (e.g., some products and service require a support representative user).

Furthermore, FIG. 3 illustrates that the method 300 also includes an act 330 of establishing a video chat between the mobile device and a support terminal. For instance, establishing the video chat includes establishing a first connection between the mobile device and the support terminal and conducting a video chat transmitted across the first connection. In particular, the first connection can include a connection established through communication servers, as described above. In addition, establishing the video chat includes establishing the video chat with a virtual support representative or a support representative user based on the request.

As shown in FIG. 3, the method 300 also includes the act 340 of determining whether a peer-to-peer connection is available between the mobile device and the support terminal. In response to determining that a peer-to-peer connection is available, the method 300 proceeds to the act 350 of establishing a peer-to-peer connection between the mobile device and the support terminal. In particular, the act 350 switches the video chat from being conducted via a communication connection through the communication servers to a peer-to-peer connection. In one or more embodiments, the act 350 may include severing the connection through communication servers after the peer-to-peer connection has been established between the mobile device and the support terminal 102. One will appreciate in light of the disclosure herein that the use of a peer-to-peer connection to conduct the video chat can reduce system resources need for the video chat, provide greater flexibility, and in some cases, allow for quicker communication between the mobile device and the support terminal.

Alternatively, in response to determining that a peer-to-peer connection is not available, the method 300 proceeds to the act 360 of maintaining the video chat through the communication servers. In one or more embodiments, the video chat may be maintained through the series of servers whether or not a peer-to-peer connection is available.

Figure 4:
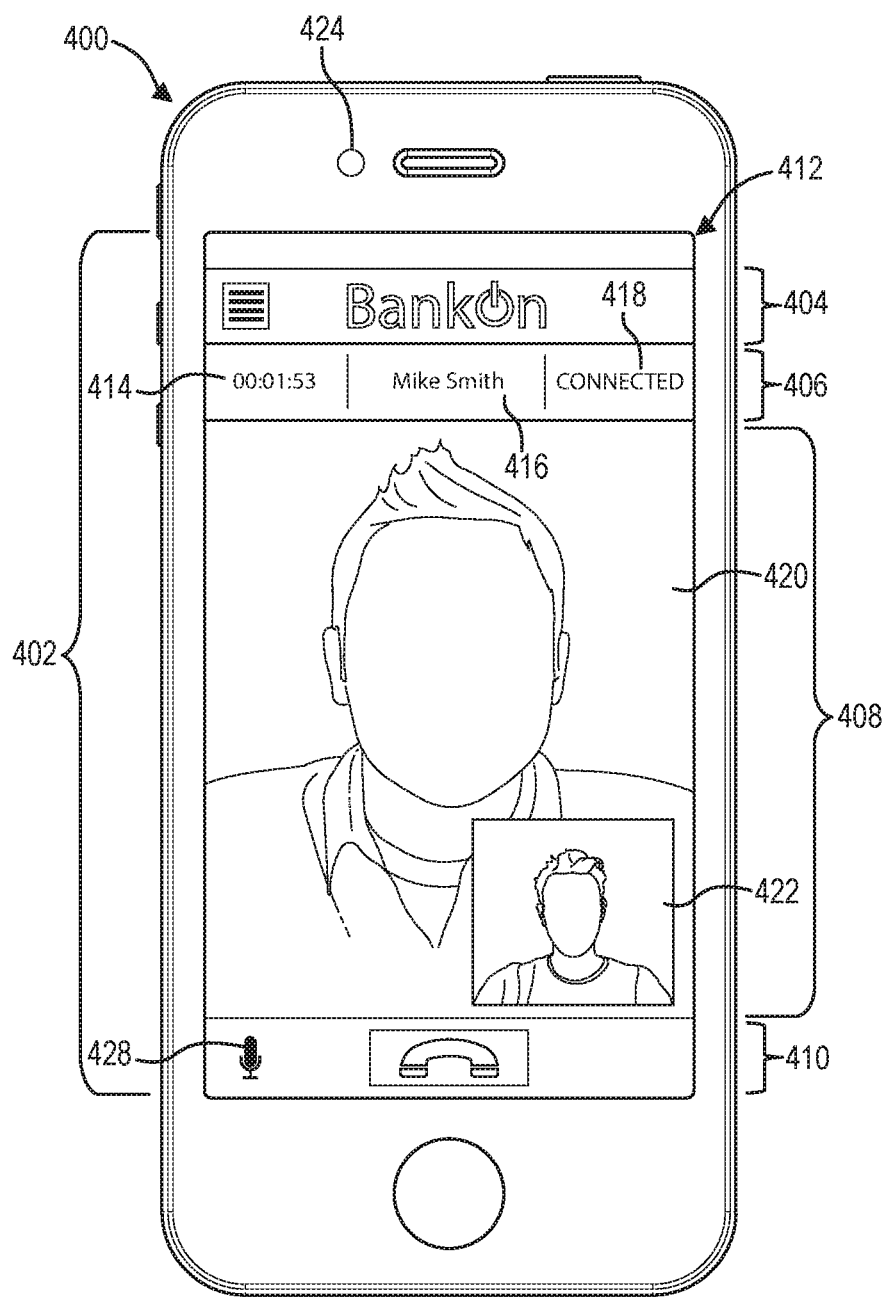
FIG. 4 illustrates a mobile device displaying a video chat interface in accordance with one or more embodiments.

FIG. 4 illustrates a mobile device 400 displaying a video chat interface 402 after a video chat has been established between a mobile device and a support terminal. The video chat interface 402 includes a heading portion 404, a session information portion 406, a video chat display portion 408, and a session control portion 410. As illustrated in FIG. 4, the video chat interface 402 utilizes the entirety of the mobile device display screen 412. In one or more alternative embodiments, the video chat interface utilizes less than the entirety of the mobile device display screen 412 in response to receiving a default display element (not shown) from a support terminal immediately after the video chat is established.

As illustrated in FIG. 4, the session information portion 406 of the video chat interface 402 displays information regarding the video chat session conducted between the mobile device and the support terminal. In particular, the session information portion 406 includes a time-keeping portion 414, a support representative identity portion 416, and a connection status portion 418. The time-keeping portion 414 displays the duration of the current video chat session. The support representative identity portion 416 displays the name of the support representative engaging in the video chat session. The connection status portion 418 displays the status of the connection between the mobile device and the support terminal. In one or more embodiments, the connection status portion 418 can indicate whether the video chat is being conducted via a peer-to-peer connection or not.

As illustrated in FIG. 4, the video chat display portion 408 includes a support representative display 420 and a mobile device user display 422. In particular, the support representative display 420 displays video content captured by the support terminal if a support representative user is providing assistance to the user. Alternatively, the support representative display 420 displays an avatar of a virtual support representative (or text thread of a chat conversation).

In addition, the mobile device user display 422 displays video content captured by a camera 424 of the mobile device 400. As shown in FIG. 4, mobile device user display 422 is displayed in a lower right corner of the video chat display portion 408. Alternatively, the mobile device user display 422 may be displayed in any other location of the video chat display portion 408. In one or more embodiments, the mobile device user display 422 may be relocated to any location in response to detecting a user interaction. For example, a user may select and, with a dragging motion, relocate the mobile device user display 422 to any other location. Further, the user may minimize or hide the mobile device user display 422.

As further illustrated in FIG. 4, the session control portion 410 of the video chat interface 402 includes a session end option 426 and a microphone mute option 428. Alternatively, one or more embodiments may include other options, such as a record option to record the audio content, visual content, or both from the video chat session.

Once a video chat is established between the mobile device and the support terminal, the support representative (e.g., a support representative user or virtual support representative) may desire to send a display element to the user of the mobile device. FIGS. 5A-5F provide various exemplary embodiments of a mobile device 500 displaying a dual pane display 502 in response to receiving various display elements 504a-f from a support terminal. While FIGS. 5A-5F illustrate a support representative user, a virtual support representative can perform one or more of the methods, techniques, and/or operations associated with the support representative user described below. Additional detail regarding a virtual support representative is described below with respect to FIGS. 6A-6C.

In one or more embodiments, as part of receiving the display element, the mobile device 500 receives a trigger that causes the mobile device 500 to initiate the dual pane display. The trigger can include a piece of JavaScript or other code, which when received by the mobile device, causes the mobile device to split the display into multiple panes. More specifically, the trigger can cause the mobile device 500 to execute code previously installed on the mobile device 500 as part of the mobile application. Such code can cause the mobile device 500 to provide multiple panes as described hereinafter.

As illustrated in FIGS. 5A-5F, the mobile devices 500 divides the mobile device display screen 506 into a first pane 508 and a second pane 510. As illustrated in these figures, the mobile device provides the video chat in the first pane 508 and display elements 504a-f in the second pane 510. Alternatively, the mobile device 500 may divide the display screen 506 into additional panes in response to receiving multiple display elements simultaneously or in response to receiving a display element formatted to use multiple panes.

In one or more embodiments, a mobile device user may choose to accept or reject a display element upon the display element being displayed in the second pane 510. For example, in response to receiving one of the display elements 504a-f and/or an accompanying trigger, the mobile device 500 divides the display screen 506 into a first pane 508 and a second pane 510. As part of presenting the second pane 510 to the user, the mobile device 500 also displays selectable options to the user to either accept or reject the display element in the second pane 510. In these embodiments, the mobile device 500 display one or more of the display elements 504a-f only when the user selects to accept it. Otherwise, if the user chooses to reject the display element, the mobile device 500 can converge the first pane 508 and the second pane 510 back into a single display (such as that shown in FIG. 4).

Additionally, the mobile device 500 may modify the size of the first pane 508 and the second pane 510 (or of additional panes) on the display screen 506 based on the display element received. For example, a received display element may require more than half of the display screen 506. As a result, the mobile device 500 apportions the first pane 508 and the second pane 510 such that the second pane 510 fills the majority of the display space of the display screen 506 and the first pane 508 fills the remaining space available. In some embodiments, one of the panes is shown within the other pane (e.g., picture-in-picture).

In one or more embodiments, a mobile device user may modify one of the display elements 504a-f For example, a display element changes as the user of the mobile device interacts with it. Alternatively, a display element may be static and such as a view-only content within the display element. In some embodiments, providing and modifying one of the display elements 504a-f may occur independently of any interaction with the video chat provided in the first pane 508. Specifically, when the support terminal provides a display element via a second server connection (e.g., a via a WebSocket server connection), communications via the second server connection can be independent of the first video chat connection.

Figure 5A:
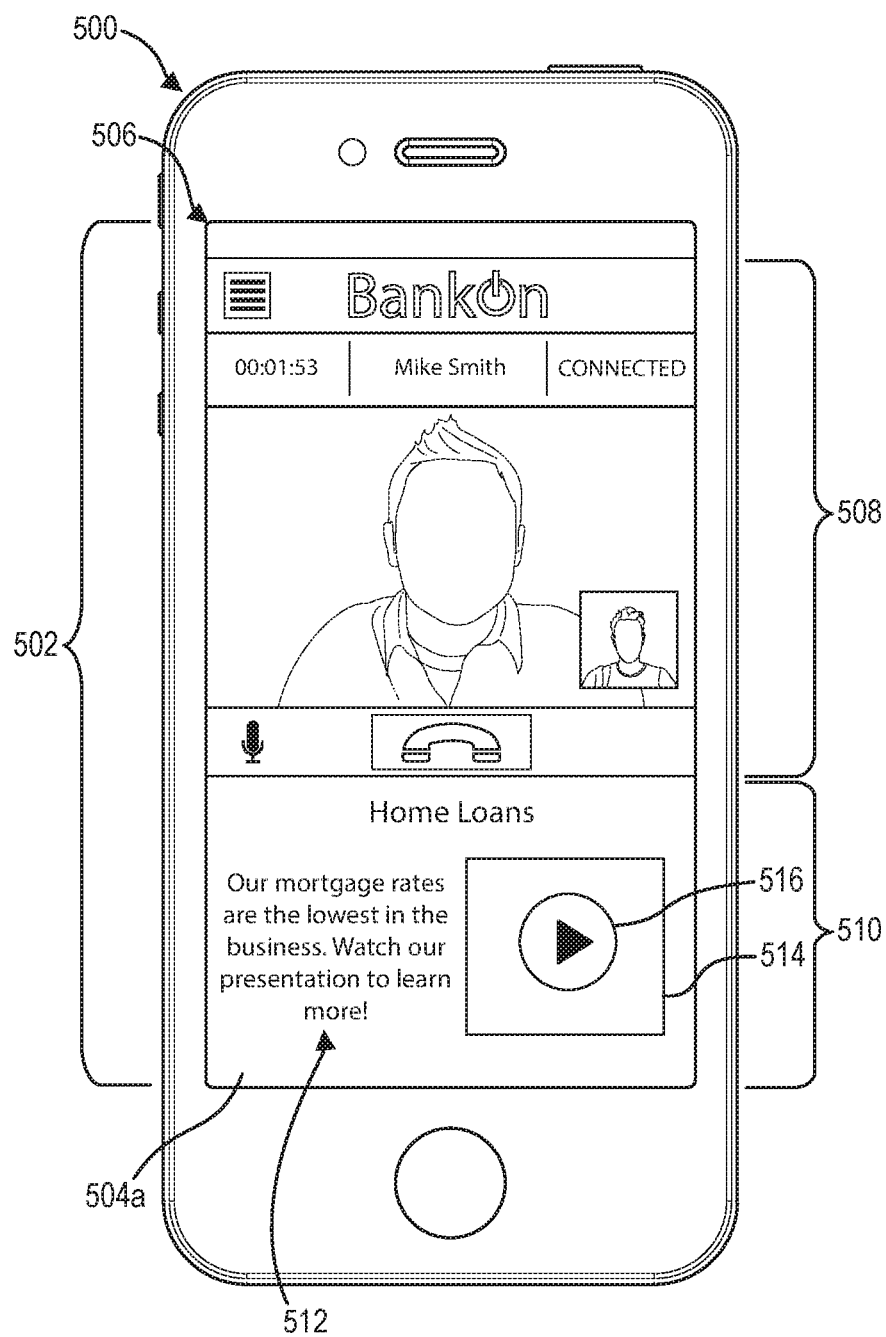
FIGS. 5A-5F illustrates a mobile device displaying various views of a dual pane display in accordance with one or more embodiments.

As shown in FIG. 5A, the first display element 504a is an informational slide comprising text and graphics. In particular, the first display element 504a includes a text portion 512 and a video portion 514. The first display element 504a provides exemplary information regarding a banking service provided by the mobile application. By way of illustration, the first display element 504a displays information regarding mortgage rates.

The video portion 514 plays an informational video in response to a user interaction. For example, the mobile device 500 plays the video portion 514 in response to detecting a user selection of a play button 516. Additionally, or alternatively, the mobile device 500 play the video portion 514 in response to detecting a user swiping gesture or a user voice command. In another example, the mobile device 500 plays the video immediately after the first display element 504a is displayed in the second pane 510 (e.g., auto-play). In one or more alternative embodiments, the first display element 504a includes only a text portion (including the text of a document), a video portion, or a non-video graphics portion (e.g., images or animations).

Figure 5B:
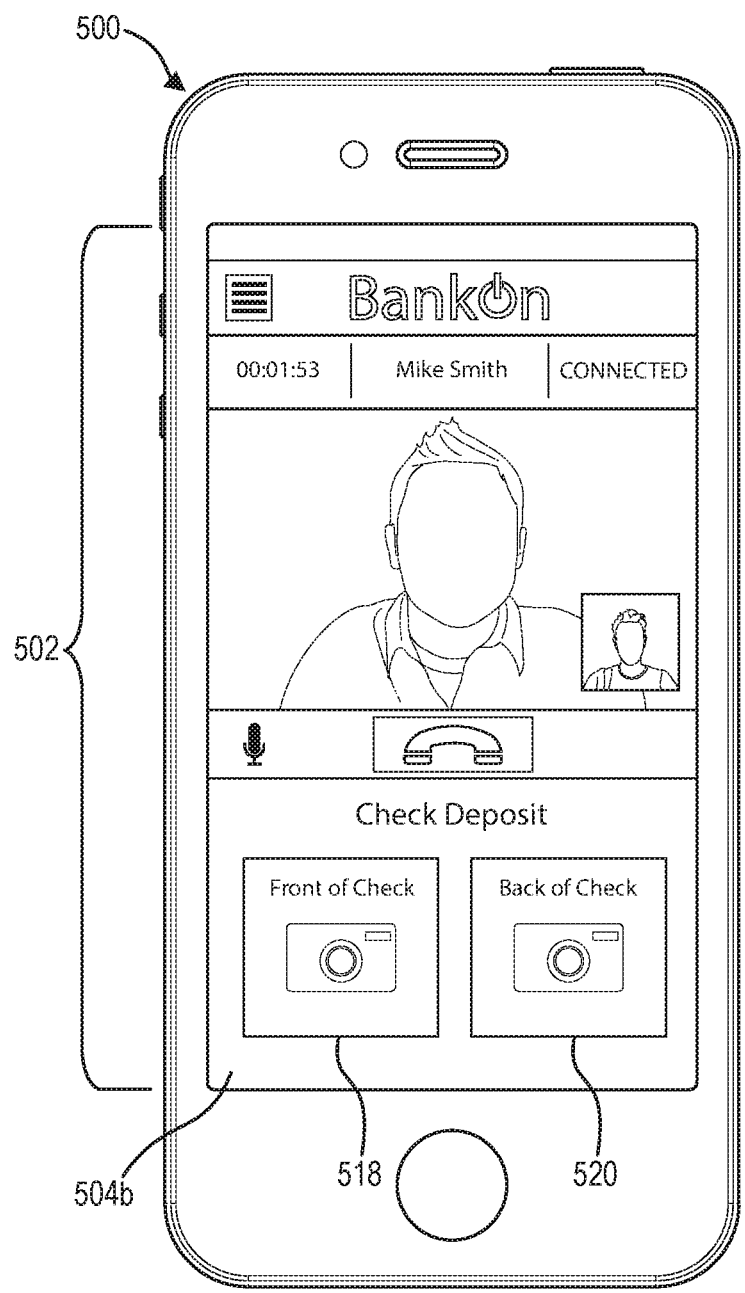

FIG. 5B illustrates another embodiment of the mobile device 500 displaying a dual pane display 502. In particular, the mobile device 500 provides a second display element 504b in the second pane 510 with an interface for capturing multiple images for check deposit. In particular, the second display element 504b includes a first selectable element 518 and a second selectable element 520, wherein the first selectable element designates a captured image as a front view of a check and the second selectable element 520 designates a captured image as a back view of a check. Upon detecting a user selection of the first selectable element 518 or the second selectable element 520, the video chat provided in the first pane 508 overlays the display of the video chat with a viewfinder display (not shown), wherein the viewfinder display provides a representation of image data captured by a camera (e.g., a camera on the back of the mobile device 500).

In some embodiments, when the mobile device 500 receives the second display element 504b from the support terminal, the mobile device 500 also receives a camera trigger that immediately activates the camera and overlays the video chat in the first pane 508 with the viewfinder display. In these and other embodiments, while the first pane 508 provides the viewfinder mode, the video chat may be continuously received by the mobile device 500. Alternatively, the visual data from the video chat may temporarily pause until a user indicates that capturing images is done. Additionally, or alternatively, the audio from the video chat transmission is still available while the mobile device user captures the images, so that the support representative user may guide the mobile device user through the process.

Upon the mobile device 500 capturing an image of the check, the mobile device 500 automatically sends the image to the support terminal for verification and check deposit. Alternatively, in one or more embodiments, the second display element 504b may include an additional button for sending an image file that has been captured to the satisfaction of the mobile device user.

In some embodiments, the mobile device 500 employs the second display element 504b to capture images of documents other than checks. For example, in one or more embodiments, the second display element 504b may enable a user to capture an image of a contract, or any other document that may be required by the support representative user. As another example, the mobile device 500 employs the second display element 504b to capture one or more forms of identification associated with the user (e.g., licenses, certificates, or photos).

Figure 5C:
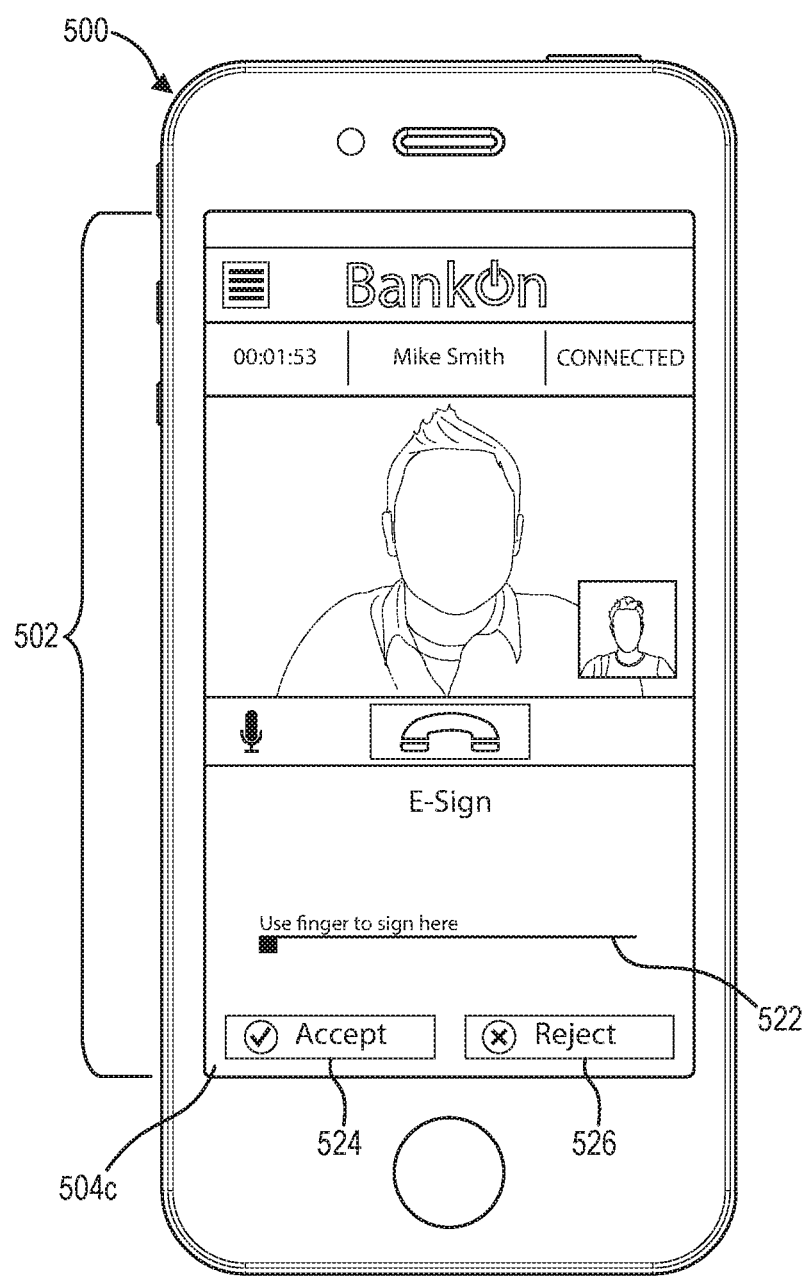

FIG. 5C illustrates another embodiment of the mobile device 500 displaying a dual pane display 502. In particular, the mobile device 500 provides a third display element 504c in the second pane 510 that is a signature pad enabling a user to enter a signature. In particular, the third display element 504c is an authentication element that includes a signature line 522, an accept graphical element 524, and a reject graphical element 526. In some embodiments, the mobile device 500 displays the authentication element within the third display element 504c upon receiving a trigger from the support terminal, as described above, to provide the authentication element to the user.

In one or more embodiments, the authentication element in the third display element 504c changes, in response to detecting a user interaction along the signature line 522, such as the user providing their signature. To illustrate, a user may use a finger, a stylus, a computer mouse, or another user input device to enter a signature on the signature line 522. After providing user input, the user may select to accept or reject the authentication element. Upon detecting a user selection of the accept graphical element 524, the mobile device 500 determines that the user confirms the authentication element. In addition, the mobile device 500 provides the user input (e.g., user signature) to the support terminal.

Upon detecting a selection of the reject graphical element 526, the mobile device 500 changes the third display element 504c to a different display element or content, such as the previously displayed display content within the display element. In some embodiments, the reject graphical element 526 changes to a "clear" graphical element upon the user entering user input to the signature line 522. In this manner, upon selecting the clear graphical element, the mobile device 500 clears the signature line 522 for the user to sign again.

Further, as previously mentioned, the support terminal often provides the authentication element to the mobile device 500 to display in the second pane 510. In one or more embodiments, the support representative user in the video chat selects and provides the authentication element to the mobile device 500. In some embodiments, the authentication element is provided as part of a framework, pipeline, template, or workflow (e.g., the mortgage application is provided in a set of ordered pages within a workflow), where the authentication element is the next element to be displayed. In various embodiments, the support terminal automatically selects and provides the authentication element based on a combination of factors, such as those described above.

Figure 5D:
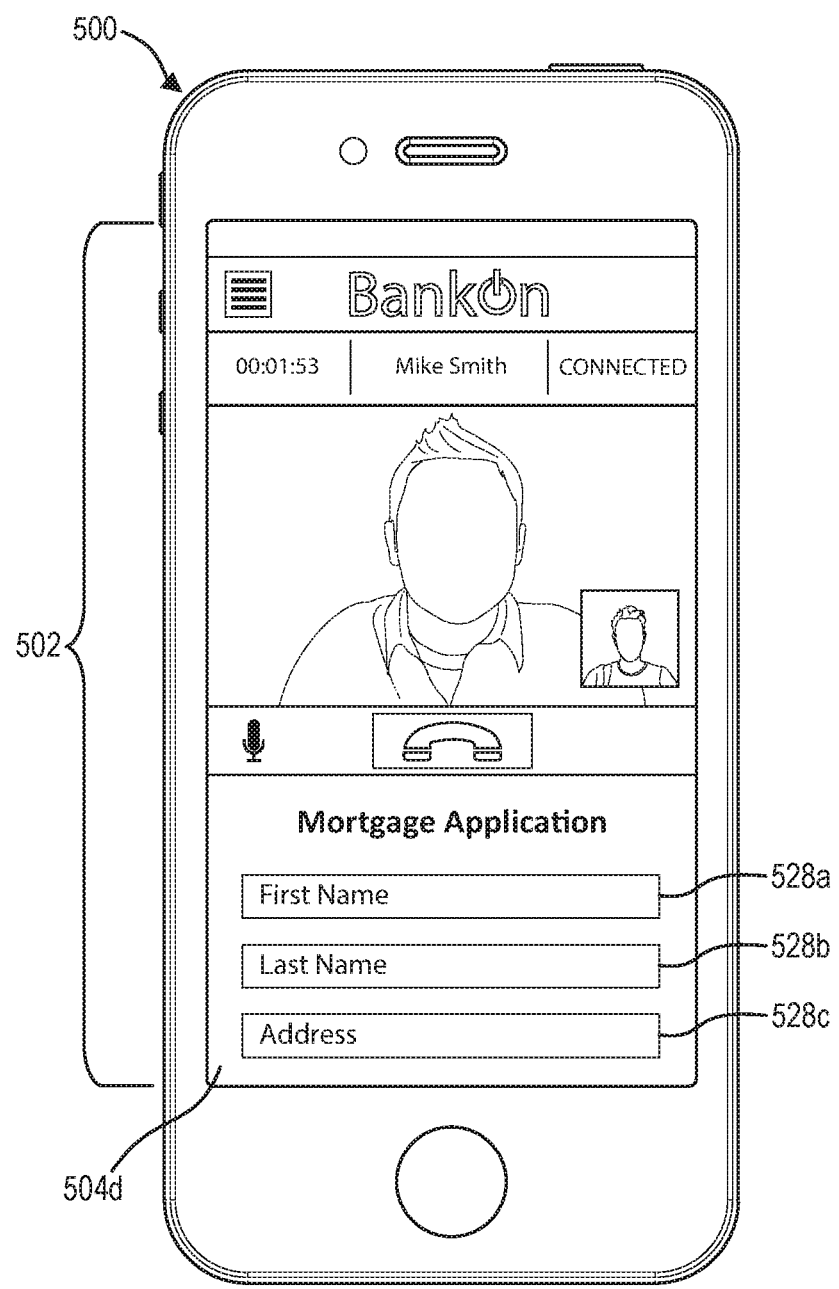

FIG. 5D illustrates another embodiment of the mobile device 500 displaying a dual pane display 502. In particular, the mobile device 500 provides a fourth display element 504d in the second pane 510 that is a fillable form that enables a user of the mobile device to enter input into the form. In particular, the fourth display element 504d includes fillable fields 528a-c. By way of illustration, fillable fields 528a-c instruct a user to input a first name, a last name, and an address, respectively. In other embodiments, the fourth display element 504d instructs a user to input other types of information. For example, the fourth display element 504d includes one or more fillable fields associated with a user's birthday, state of residence, or driver's license number.

Upon detecting a user selection of one of fillable fields 528a-c, the mobile device 500 presents the mobile device user with an alphanumeric keypad for entering information into the corresponding line. Additionally, or alternatively, the mobile device 500 presents the user with a list of optional inputs where there are a limited number of inputs available or acceptable (e.g., a drop-down list). For example, if a fillable field is associated with a state of residence, upon selecting that fillable field to provide user input, the fourth display element 504d displays a list of states as potential input options. Additionally, or alternatively, the mobile device 500 may accept information through voice command for a fillable field, where the user vocally inputs the requested information.

Figure 5E:
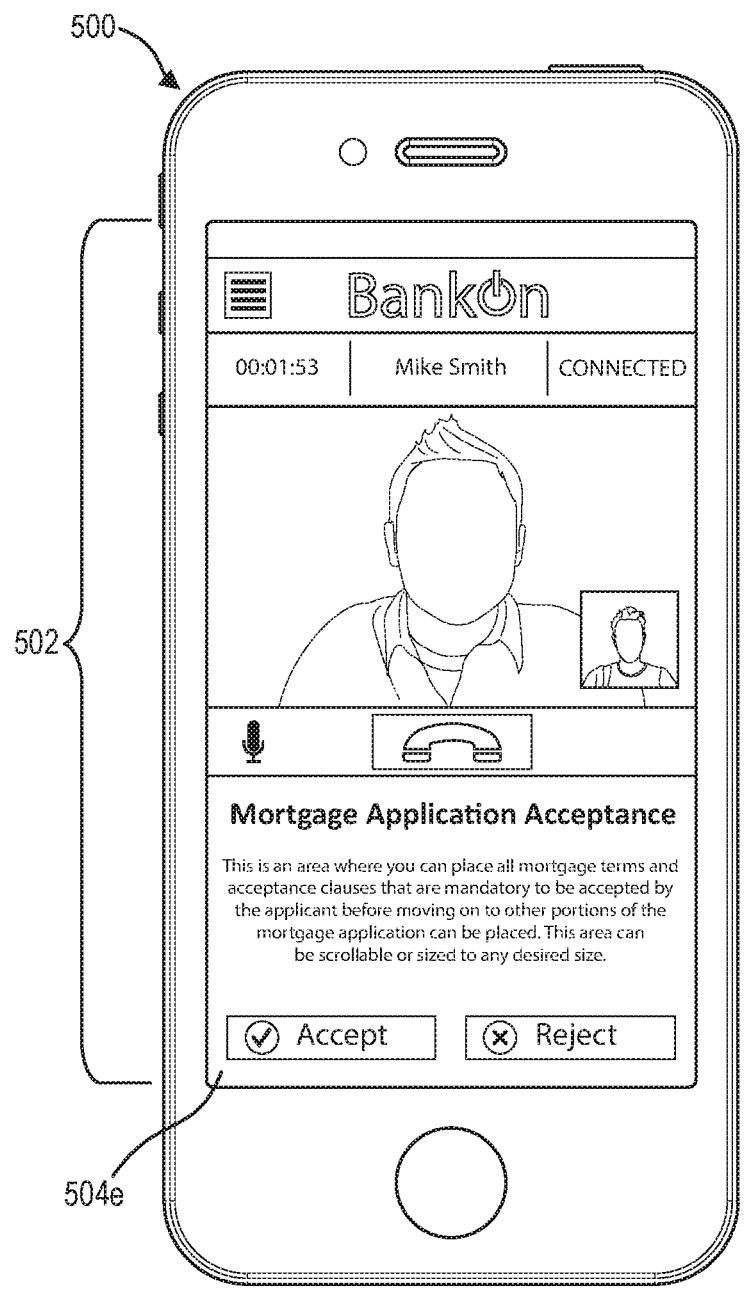

FIG. 5E illustrates yet another embodiment of the mobile device 500 displaying a dual pane display 502. In particular, the mobile device 500 provides a fifth display element 504e in the second pane 510 that includes terms and conditions of a document. In addition, the fifth display element 504e includes an authentication element that enables the user to accept (e.g., the accept graphical element 524) or reject (e.g., the reject graphical element 526) the terms and conditions.

In some embodiments, the text or content in the second pane 510 (i.e., the document of terms and conditions shown in the fifth display element 504e) is divided into sections. For each section, the user must select the accept graphical element 524 to view the next section. In some embodiments, the mobile device 500 captures and provides an image of the user each time the user selects the accept graphical element 524. Additionally, the mobile device 500 can provide an image of the user upon the user selecting the accept graphical element 524 at the end of all the sections to confirm acceptance of all the terms and conditions provided in a document.

Further, in some embodiments, the mobile device 500 expands the second pane 510 to enable a user to view more text included in a document. For example, the mobile device 500 automatically expands the size of the second pane 510 (e.g., to the full screen) while the user reads the terms and conditions. In an alternative example, the mobile device 500 enables the user to resize the second pane 510 to a user-desired size. Upon detecting the user accepting the document, the mobile device 500 resizes the second pane 510 to the original size.

Figure 5F:
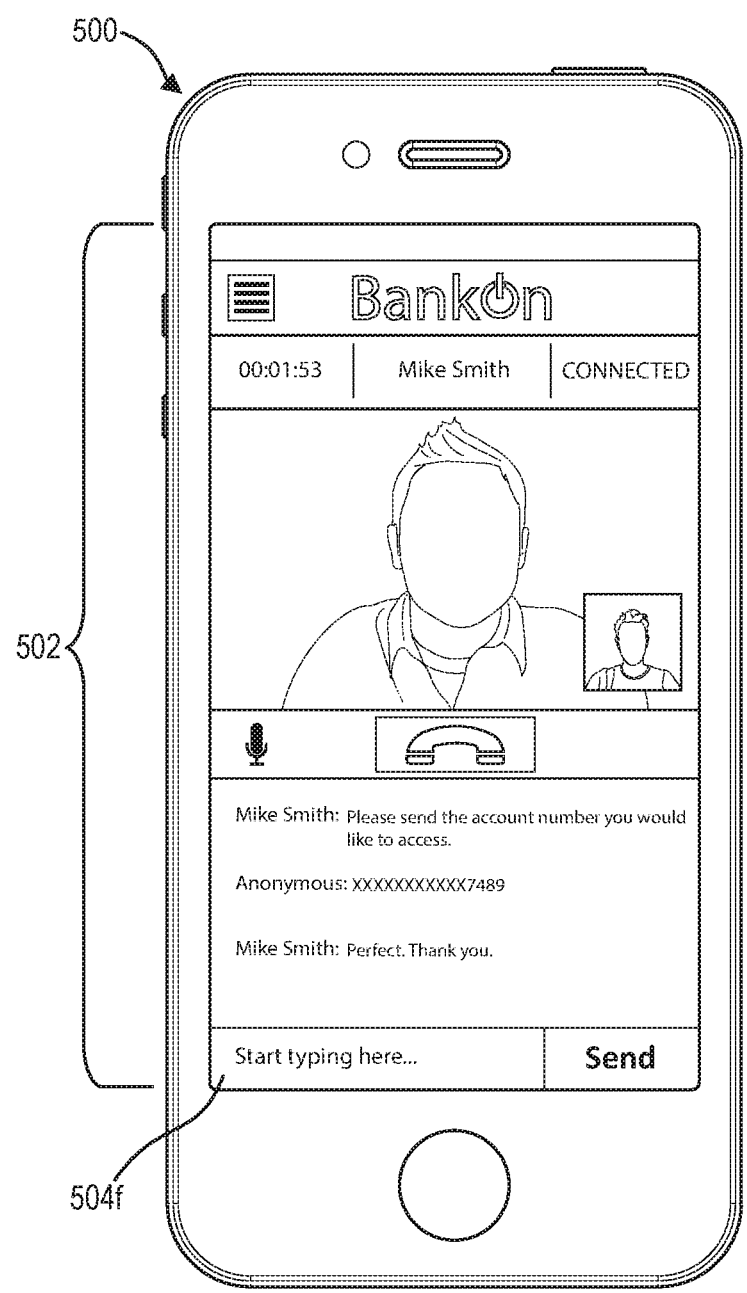

FIG. 5F illustrates another embodiment of the mobile device 500 displaying a dual pane display 502. In particular, the mobile device 500 provides a sixth display element 504f in the second pane 510 that is a text-based messaging interface. As shown, the sixth display element 504f enables a user to input and provide a text-based message to the support terminal (e.g., a support representative user or a bot). Additionally, the sixth display element 504f may receive and display text-based messages from the support terminal.

In one or more embodiments, the mobile device 500 provides a combination of the display elements 504a-f described above. Additionally, or alternatively, the mobile device 500 displays different display elements than described above. For example, the support terminal generates and sends computer-readable code, such as a bar code or a Quick Response (QR) code. The computer-readable code, when scanned, can cause another device to perform an action. For instance, the computer-readable code, when scanned by an ATM, can cause the ATM to dispense a predetermined amount of funds.

In some embodiments, rather than directly providing content for a display element, the support terminal provides a link to a location where the mobile device 500 can access and display the content. For example, the support terminal sends a link to a local or remote location where a document, an authentication element, or other content can be accessed. In response, the mobile device 500 uses the link to access and display the content within the second pane 510.

Further, as discussed above, a display element may include more information or modifiable elements than can be presented on a single pane at one time. Therefore, in one or more embodiments, the display elements 504a-f may be scrollable, wherein a user may scroll in a direction where information or modifiable elements in addition to those currently presented may be viewed and interacted with to access and/or enter information. Alternatively, the display elements 504a-f may provide information or interactive elements on multiple pages and present a user with options to view a subsequent or previous page.

Figure 6A:
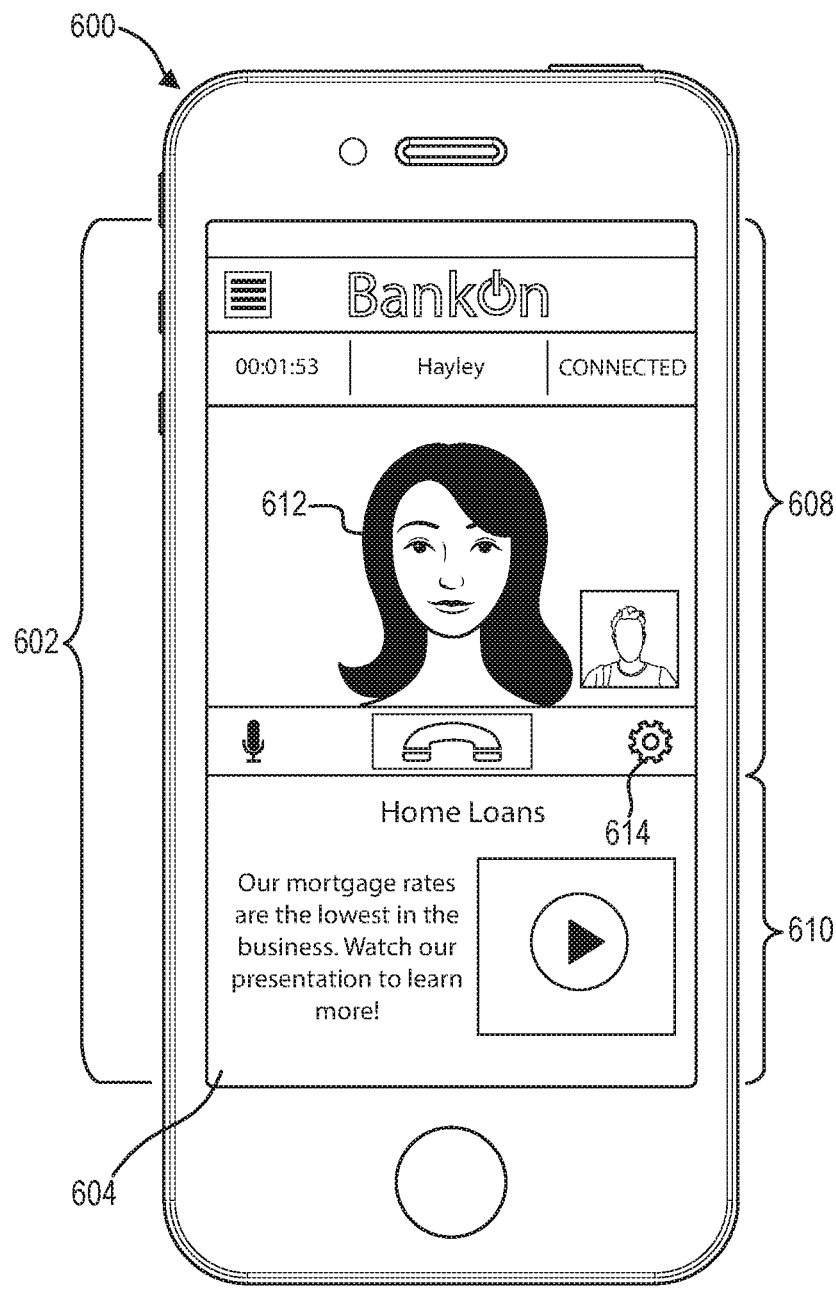
FIG. 6A-6C illustrates a mobile device displaying a virtual support representative in accordance with one or more embodiments.
Figure 6B:
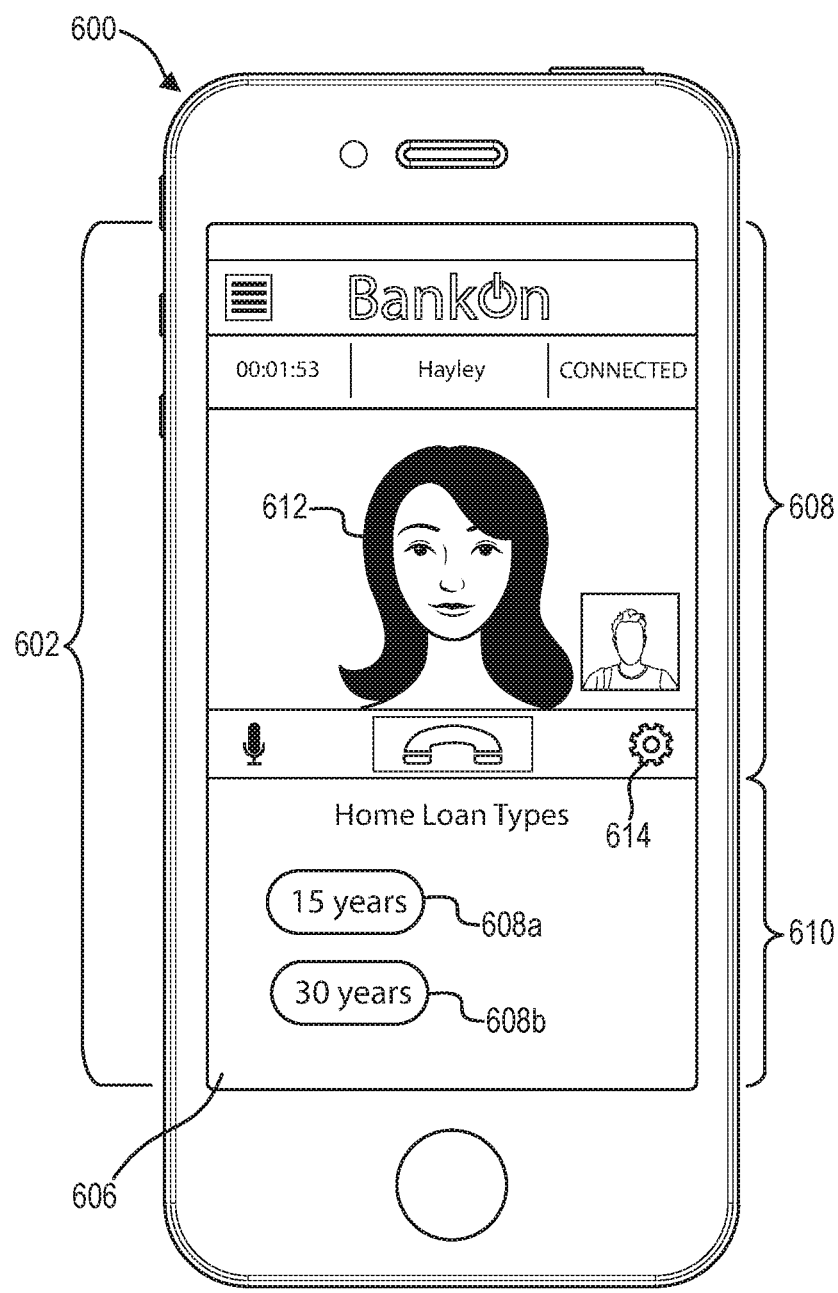
Figure 6C:
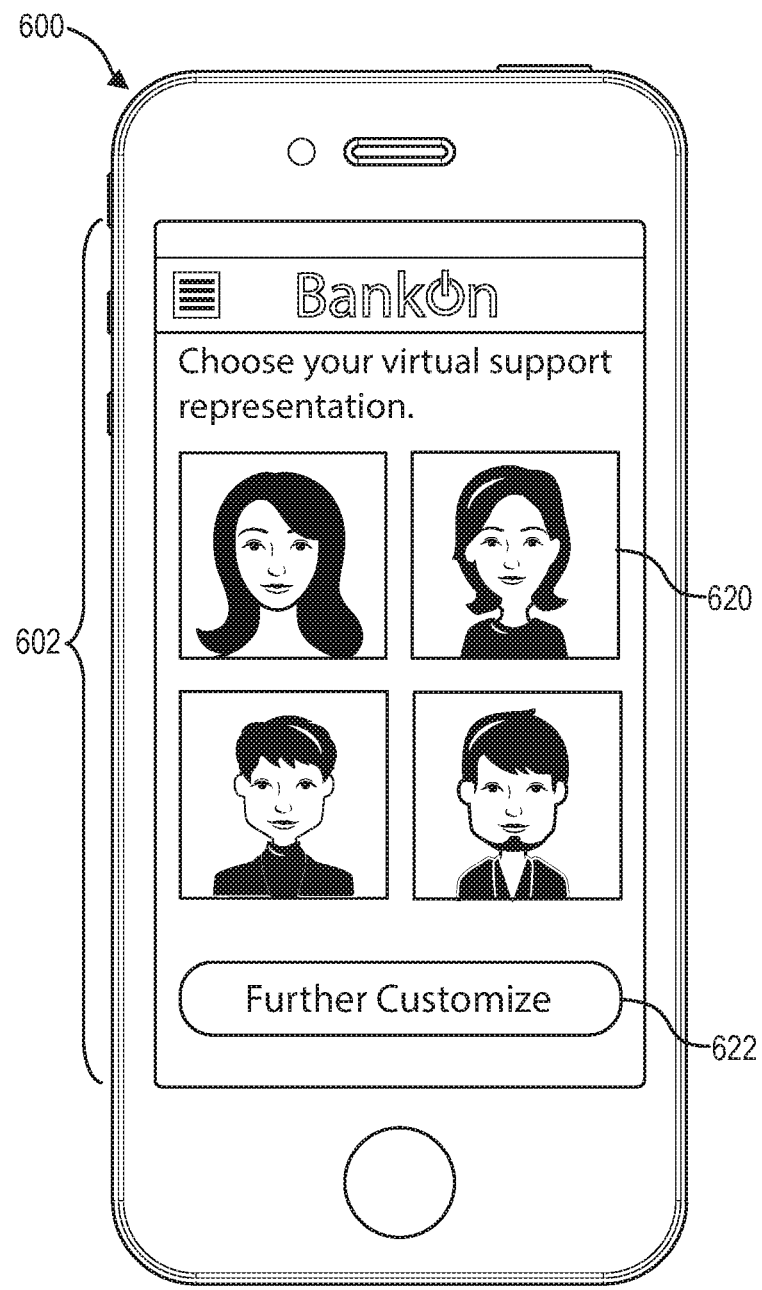

FIG. 6A-6C illustrates a mobile device 600 displaying a virtual support representative 612 in accordance with one or more embodiments. As shown, the mobile device 600 includes a graphical user interface that includes many of the features, components, displays, and elements previously described. In particular, the mobile device 600 includes a dual pane display 602 having a first pane 608 and a second pane 610. As shown, the first pane 608 displays, among other elements, a video chat with the virtual support representative 612. In addition, the second pane 610 displays a display element 604, as previously described. In addition, the second pane includes a display element 604.

In general, the virtual support representative 612 (i.e., the support terminal implementing the virtual support representative) offers the same support and assistance to a user as does a support representative user. In addition, rather than displaying a support representative user, the support terminal provides the mobile device 600 with an avatar of a person which provides similar services as a support representative user. For example, the virtual support representative 612 guides a user through the process of depositing a check, looking up account information, or starting an application for a loan. Further, the virtual support representative 612 automatically provides various display elements to the user, which the mobile device 600 shows in the second pane 610, as described above in connection with FIGS. 5A-F.

In one or more embodiments, the virtual support representative 612 is an animated avatar that mimics the movements and actions of a human. For example, the support terminal generates the virtual support representative 612 to change facial expressions, movements, and gestures as the virtual support representative 612 communicates with a user. For instance, the virtual support representative 612 provides lip movements that match the words spoken to the user. In alternative embodiments, the virtual support representative 612 is a static image of an avatar.

The support terminal can employ speech-to-text to recognize speech provided by the users when providing the virtual support representative 612 in a video chat. Similarly, the support terminal provides text-to-speech or other natural language speech patterns to have the virtual support representative 612 "speak" back to the user within the video chat. In some embodiments, the video chat displays a print out of speech either heard or provided by the virtual support representative 612 to the user in a closed-captioning manner.

To illustrate, in one or more embodiments, the user asks a question to the virtual support representative 612 via the video chat. In particular, the mobile device 600 provides the audio of the user's voice to support terminal via the first connection. In response, the support terminal processes the question into text, analyzes the text to determine a reply (described further below), converts the automated reply to speech, and provides the automated reply back to the user by way of the virtual support representative 612. In some embodiments, the support terminal also determines and provides content and/or a display element to the mobile device 600 to be displayed in the second pane 610 during the video chat.

As mentioned above, the support terminal can analyze a user's speech from to provide an automatized reply to the user. In some embodiments, the support terminal uses a workflow, framework, template, document, information pipeline, knowledge base, or decision tree to determine the context of the question and/or an appropriate solution to provide to the user. For example, if the virtual support representative 612 (i.e., support terminal) is assisting a user in depositing a check via the mobile device 600, the virtual support representative 612 walks the user through the process based on a workflow as well as uses a knowledge base (e.g., a repository of known and resolved issues) to resolve user issues as they arise.

In some embodiments, the support terminal employs a machine learning algorithm to determine how to automatically respond to a user. For example, the support terminal trains the machine learning algorithm based on transcripts and logs of previous video chat (and text) sessions between users and support representative users. In some embodiments, training the machine learning algorithm includes other user inputs, such as a selection of an element, or a response to a display element. In addition, the support terminal uses knowledges bases and other information databases to train the machine learning algorithm.

Based on the training, the machine learning algorithm detects questions and issues from a current user and determines one or more appropriate solutions to automatically provide to the user. In addition to providing verbal feedback, the support terminal employs the machine learning algorithm to identify text, graphics, or other content to provide to the mobile device 600 via a first connection (i.e., the video chat) and/or via a second connection (i.e., the display element 604 in the second pane 610). For example, in answering a user's question, the virtual support representative 612 both answers the question verbally using the video chat as well as provides a relevant display element 604 to the mobile device 600.

By using workflows, information pipelines, frameworks, templates, knowledge bases, documents, decision trees, and/or machine learning algorithms, the virtual support representative 612 (i.e., support terminal) can automatically assist without support representative user intervention. For example, the virtual support representative 612 verbally walks a user through an operation with which the user is unfamiliar. In many cases, a user feels more comfortable communication with the virtual support representative 612 than with a support representative user (e.g., an actual real person), which improves the user's evaluation and opinion of the support terminal.

As mentioned above, in some embodiments, the virtual support representative 612 (i.e., support terminal) automatically determines to provide a display element to a user in connection with the video chat. For example, based on user input (e.g., something the user said or other user input provided on the mobile device 600), the support terminal determines a particular piece of content to provide via the second connection to be displayed in the second pane 610 of the mobile device 600. For instance, the support terminal identifies and provides, via the virtual support representative 612, a document, web page, image, form, link, slide, animation, and/or other content resource to the mobile device 600.

In some embodiments, the virtual support representative 612 provides identified content within the video chat such that the user can follow along. For example, the virtual support representative 612 shows an animation on how to fill out a form currently displayed as the display element 604 in the second pane 610. In this manner, the support terminal and virtual support representative 612 can educate, assist, answer questions, walkthrough, or guide the user through one or more operations using both the video chat and display elements simultaneously. Alternatively, the support terminal provides the identified content to the mobile device 600 with instructions to display the content in the second pane 610 or an additional pane (e.g., a temporary third pane that partially or fully overlaps the video chat first pane or where the mobile device 600 temporarily shrinks the video chat first pane to display the third pane behind the first pane).

While the virtual support representative 612 can provide assistance and guidance to users, in one or more embodiments, the virtual support representative 612 (i.e., support terminal) determines to transfer a video chat to a support representative user. As one example, the support terminal, via the virtual support representative 612, identifies an issue or problem that requires additional attention. For instance, the support terminal fails, after multiple attempts, to recognize the user's issue or problems using the virtual support representative 612. In another instance, the support terminal detects the user's issue, but cannot locate a solution, or the solution is too complex to resolve without assistance from a support representative user.

In another example, the support terminal determines to transfer to a support representative user based on a framework or workflow step (e.g., workflow tracking). For example, the support terminal uses steps in a framework to assist a user in completing an operation. Upon progressing to a particular step, the framework provides instructions to transfer the video chat from the virtual support representative 612 to a support representative user. For instance, after a user completes an application, the support terminal transfers the video chat to a support representative user to perform a final confirmation.

As another example, the virtual support representative 612 (i.e., support terminal) determines that a constraint, such as a document constraint or a legal constraint, triggers the transferring the video chat from the virtual support representative 612 to a support representative user. For instance, to be legally binding, a support representative user must witness the user signing a particular contract or witness a verbal confirmation from the user. Additionally, the support terminal can provide a list of tasks and operations that the virtual support representative 612 is precluded from performing.

Upon the support terminal determining to transfer to a support representative user, the support terminal can determine a particular support representative user or group where to transfer the video call. In one or more embodiments, the support terminal identifies a support representative user or group based on the subject of the video chat. For instance, based on identifying that the user is applying for an automotive loan, the support terminal transfers the video chat to an automotive group of support representative users. Likewise, based on the context of the video chat and the detected issue, the support terminal transfers the video chat to a particular support representative user who is experienced in the subject and/or resolving user issues.

In additional embodiments, the support terminal transfers the video chat to a support representative user based on detected attributes of the user. For example, if the user speaks a particular language (e.g., Chinese English, Spanish, Hindi, Arabic, Japanese), the support terminal detects the language and transfers the user to a support representative user that is fluent in the detected language. In particular, the support terminal uses speech and language detection to determine the user's language (e.g., spoken or written), which the support terminal uses in determining the support representative user to whom to transfer the user. In some embodiments, the user's profile indicates a user language preference (e.g., spoken and/or written), which the support terminal can also use when determining a support representative user.

In some embodiments, the support terminal transfers the video chat to a support representative user based on availability. For example, the support terminal assesses multiple support representative users to determine whether one or more support representative users are available. If multiple support representative users are available, the support terminal can determine a support representative user based on video chat volume, caller efficiency, experience, or other factors. If no support representative users in a group are available, the support terminal can determine whether to have the user to hold/wait (e.g., in a queue) or whether to transfer the to an available support representative user in another group.

In various embodiments, the support terminal transfers the video chat to a support representative user based on a customer rating or priority. For example, if the user has a high customer rating, the support terminal transfers the video chat to an experienced support representative user. Similarly, if the user is at a high priority stage of a workflow (e.g., about to finalize a business loan or home mortgage), the support terminal priorities the user over other users waiting in a queue. Otherwise, if the support terminal determines that the user has a lower rating or priority, the support terminal can place the user in a queue to be transferred to the next available support representative user. As another alternative, the support terminal informs the user that no support representative user is currently available and/or offer to call/notify (e.g., push notification) the user when a support representative user is available.

In some embodiments, the support terminal temporarily transfers the video chat to a support representative user. For example, once the support representative user resolves the issue, the support representative user transfers the video back to the virtual support representative 612. The virtual support representative 612 then resumes assisting the user.

In another example, rather than transferring the video chat to a support representative user, the support terminal enables a support representative user to temporarily control the avatar of the virtual support representative 612 to help resolve the user's issue. For instance, the support terminal provides an unresolved issue to a support representative user. The support representative provides a solution to user via the virtual support representative 612 without the user detecting the support representative user's assistance. The support representative user could also provide addition information and/or context to the support terminal to enable the support terminal to automatically resolve the user's issue (e.g., re-assign the virtual support representative 612 to a different workflow or workflow step). Alternatively, upon receiving the issue notification, the support representative user takes control of the video chat to directly assist the user.

To assist in transferring a video chat from the virtual support representative 612 to a support representative user, the support terminal provides a log or tasks transcript to the support representative user. By providing a tasks transcript, the support terminal can ensure that no information from a particular video chat session is lost or repeated by the user. For example, the support representative user uses the tasks transcript (by reading, listening, or watching) to get up to speed on the communications between the virtual support representative 612 and the user, which provides additional context in resolving the user's issue. In particular, the tasks transcript indicates the issue or reason why the video chat was transferred to the support representative user.

In one or more embodiments, a tasks transcript includes a log of each task/action performed by the virtual support representative 612 (i.e., support terminal), a timestamp when the task was performed, a workflow step associated with the task, and/or the user's response (e.g., received user input) to the task. In some embodiments, the tasks transcript includes a transcription of the conversation between the tasks transcript and the user. In various embodiments, the tasks transcript includes additional information, such as video chat session information, user profile information, the location of the mobile device 600, and/or an assigned priority. In some embodiments, the tasks transcript is split into sub-logs that separates (or otherwise codes) completed tasks/actions, information provided, user input, and conversations. In one or more embodiments, the tasks transcript includes a recording of the video chat and/or display elements provided to the mobile device 600.

In additional embodiments, the support terminal maintains a tasks transcript for training purposes. Further, the support terminal can maintain the tasks transcript upon transferring the video chat to a support representative user. As mentioned above, the support terminal can use a machine learning algorithm to learn and provide guidance to a user via an avatar in the video chat. In particular, the support terminal uses tasks transcripts to train the machine learning algorithm to recognize when a transfer to a support representative user occurred and the context that caused the transfer. Similarly, the support terminal uses tasks transcripts to recognize which actions resulted in positive user input (e.g., a user signing an agreement or uploading a document) as well as negative user input (e.g., user prematurely ending a video chat session or resulting in an unexpected transfer).

Furthermore, an administrative support representative user can review a tasks transcript and use it to train one or more support representative users. For example, the administrative support representative uses a video or audio replay of a previous recorded video chat session to teach support representative user how to resolve a particular user issue when dealing with users in the future.

As mentioned above, the virtual support representative 612 can use user audio input from to provide feedback and assistance to the user. To illustrate, FIG. 6B shows the virtual support representative 612 assisting a user with fillable fields or other selectable elements provided in the second pane 610. In particular, FIG. 6B illustrates the dual pane display 602 of the mobile device 600 having the first pane 608 and the second pane 610, where a video chat of the virtual support representative 612 is displayed via the first pane 608. The second pane 610 displays a display element 606 with two selectable elements 608*a-b*.

As shown within the display element 606, the two selectable elements 608*a-b* include a first selectable element 608*a* (i.e., "15 Years") and a second selectable element 608*b* (i.e., "30 Years"). In some cases, the virtual support representative 612 provides the display element 606 to the mobile device 600, as described above. For example, the virtual support representative 612 provides the display element 606 to the mobile device 600 after the user completes the previous display element 604 (i.e., "Home Loans") described above with respect to FIG. 6A.

In addition to providing the two selectable elements 608*a-b*, the virtual support representative 612 can interact with the user, including asking questions that invoke a verbal or touch—input response (e.g., "We have a variety of home loan options that I will explain to you; which option would you like to discuss first?"). In addition to manually selecting one of the two selectable elements 608*a-b*, the user can verbally provide a response to the question. For example, the virtual support representative 612 detects the user's verbal response as audio input, determines the audio input as described above, and automatically selects one of the two selectable elements 608*a-b* based on the audio input. For instance, the virtual support representative 612 detects the user saying "30 years" and, in response, automatically selects the second selectable element 608*b* (i.e., 30-years) for the user, and begins explaining 30 year mortgages to the user. The virtual support representative 612 can further interact with the user's verbal and non-verbal responses, as explained earlier.

As shown in FIGS. 6A and 6B, the mobile device 600 includes a settings selectable element 614. In one or more embodiments, the settings selectable element 614 enables a user to modify the virtual support representative 612. For instance, upon selecting the settings selectable element 614, the mobile device 600 enables the user to change to appearance of the virtual support representative 612 (e.g., chose a new avatar), the background of the video chat, or switch the first pane to a text transcript between the user and the virtual support representative 612.

To illustrate, FIG. 6C displays the mobile device 600 providing a set of avatars 620 from which a user can select a virtual support representative 612. Based on user preference, the user can select characteristics, such as gender, age, and/or lifelikeness. As shown, the user can select an avatar from the default set of avatars 620. Alternatively, the user can generate a personalized avatar.

In addition, the mobile device 600 can enable the user to select a further customize selectable element 622 to further customize the avatar of the virtual support representative 612. For example, the mobile device 600 enables the user to select features relevant to the speech of the virtual support representative 612, such as talk speed, accent, inflection, pitch, and response time. Another feature can include whether to provide closed captioning within the video chat. Additional or alternative features can include language preferences, privacy settings for the video chat, bandwidth constraints, and preferences with respect to a virtual support representative versus a support representative user.

FIG. 7 illustrates a sequence 700 of transferring a video chat from a virtual support representative to a support representative user in accordance with one or more embodiments. As shown, the sequence 700 can be implemented between the support terminal 102 and the mobile device 104 described above. For example, in some embodiments, the mobile device 104 displays two or more panels to a user where the first panel includes a video chat and the second panel includes a display element, as described above.

As shown in FIG. 7, the mobile device 104 and the support terminal 102 establish 702 a video chat via a first connection. In particular, the mobile device 104 sends a request for a video chat to the support terminal 102. In response, the support terminal 102 provides a connection (i.e., first connection) that facilitates a video chat session. In alternative embodiments, the mobile device 104 and the support terminal 102 establish an audio or text chat session.

In some embodiments, the mobile device 104 provides additional context regarding why a user of the mobile device 104 requested the video chat. For example, the mobile device 104 indicates that the user is filling out a particular application or engaged in a specific operation. Based on the contextual information, the support terminal 102 can route the video chat to an appropriate support representative (virtual or actual). Alternatively, the support representative communicates with the user via the video chat to identify contextual information and/or the user's issue.

As shown, upon establishing the video chat via the first connection, the support terminal 102 provides 704 a virtual support representative to automatically conduct the video chat. For example, the support terminal 102 displays the virtual support representative in the form of an avatar in the video chat. As described above, the virtual support representative can automatically assist a user to educate, assist, and/or guide the user with respect to a number of products and services without the need of a support representative user.

To illustrate, FIG. 7 shows the support terminal 102 automatically determining 706 a display element to provide to the user (via the mobile device 104). For example, the support terminal 102 analyzes the contextual information and/or user input (e.g., recognized speech-to-text) to determine a display element relevant to the user. Additionally, or alternatively, the support terminal 102 follows a workflow, template, document, decision tree, and/or information pipeline to automatically identify a display element. Upon identifying a display element, the support terminal 102 automatically provides 708 the display element to the mobile device 104 via a second connection. As described above, the support terminal 102 establishes a second connection separate from the first connection that hosts the video chat. In one or more embodiments, as described above, the display element can include text, images, video clips, documents, selectable fields, fillable filed, or selectable elements.

As shown, the mobile device 104 displays 710 displays the video chat in a first panel and the display element in the second pane. As described above, the display element can include a trigger that causes the mobile device 104 to add an additional pane (e.g., a second pane) to the graphical user interface to accommodate both the video chat and the display element. In this manner, the support terminal 102 can provide various display elements to assist the user while maintaining a video chat with the user.

While not specifically illustrated, the sequence 700 can repeat the actions of the support terminal 102 automatically determining 706 a display element to provide to the user and automatically providing 708 the display element to the mobile device 104 via the second connection as well as the mobile device 104 displaying the display element in the second pane. In particular, as the support terminal 102 receives addition user input for the user, such as the user providing additional questions or comments or the user providing confirmation of an authentication element, the support terminal 102 can automatically identify and provide a new or next display element to provide to the mobile device 104.

As shown in FIG. 7, the mobile device 104 provides 712 user input based on the display element to the support terminal 102. For instance, the user makes a comment on the display element, asks a question based on the display element, selects an element in the display element, fills in information into the display element, or otherwise interacts with the display element. In particular, the mobile device 104 detects and provides the user input to the support terminal 102, which analyzes and identifies to type and content of the user input. For example, if the display element includes a signature line of a document, the user provides their signature over the display line, and the mobile device 104 provides the signature (i.e., user input) to the support terminal 102. In some embodiments, the mobile device 104 provides the user input to the support terminal 102 via third connection that is separate from the first video chat connection and second display element connection.

In addition, the support terminal 102 determines 714 to transfer the video chat to a support representative user. For instance, based on the received user input, the support terminal 102 determines that the virtual support representative is unable to or restricted from further assisting the user, as described above. As such, the support terminal 102 identifies and transfers the video chat from the automated virtual support representative to a support representative user. Alternatively, the support terminal 102 determines to transfer the video chat to a support representative user based on instructions in a workflow step, knowledge base, document, or decision tree, as previously explained.

Upon the support terminal 102 transferring the video chat to the support representative user, the support terminal 102 continues 718 the video chat between the user and the support representative user. As described above, in one or more embodiments, the support terminal 102 can provide the support representative user with a tasks transcript or log to bring the support representative user up-to-date regarding the user's situation and/or the reason why the video chat was transferred. In this manner, the user need not repeat their issue or problem to the support representative user.

With the video chat transferred, the support representative user can help the user complete one or more operations. As described above, the support representative user can conclude the video chat with the user, assist the user in other issues, or transfer the video chat back to the virtual support representative to assist the user with other concerns or to provide additional information to the user.

Figure 8:
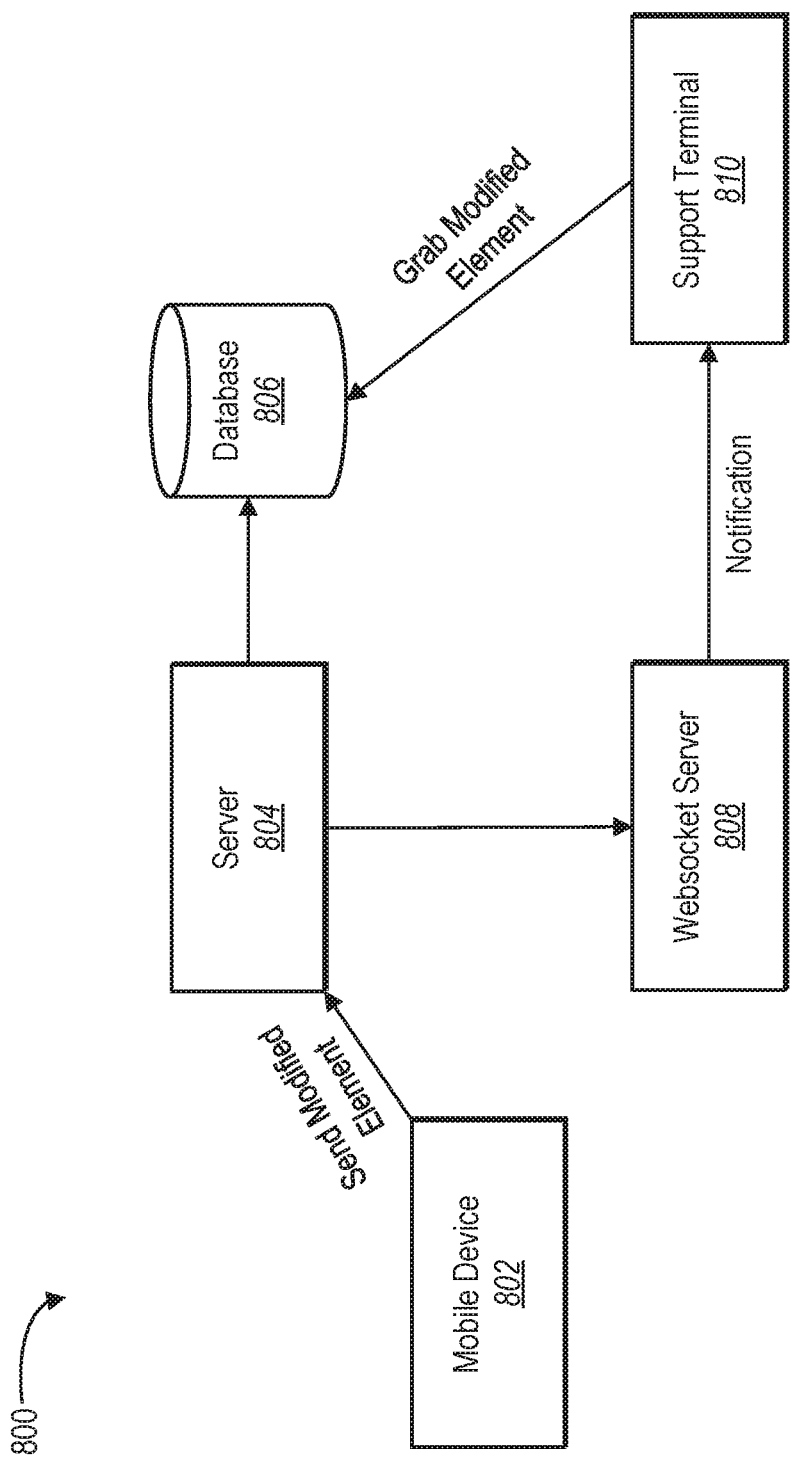
FIG. 8 illustrates an example implementation of a communications system used to send a modified display element in accordance with one or more embodiments.

FIG. 8 illustrates an example implementation of a communications system 800 (or simply "system 800") used to send a modified display element or another reply to a display element. As illustrated in FIG. 8 the system 800 includes a mobile device 802, a server 804, a database repository 806, a WebSocket server 808, and a support terminal 810. While shown as separate components, in some embodiments, the server 804, the database repository 806, the WebSocket server 808, and the support terminal 810 are included in a support system.

The system 800 establishes a connection between the mobile device 802 and the database repository 806 through the server 804. The connection is a third connection in addition to the first and second connections discussed with respect to the system 100 of FIG. 1. The server 804 enables the mobile device 802 to securely transmit a modified display element to the database repository 806. As illustrated in FIG. 8, the server 804 is a single server. Alternatively, the third connection may be made through a series of servers.

After receiving a modified display element, the server 804 forwards the modified display element to the database repository 806 and sends a notification to the support terminal 810 through the WebSocket server 808. In one or more alternative embodiments, the notification may be sent to the support terminal directly from the mobile device 802. The notification indicates that the database repository 806 has received the modified display element and provides a location of the element within the database repository 806 so the support terminal 810 may grab the modified element. Additionally, or alternatively, the notification may include a link to the location of the modified display element, enabling the support terminal 810 to quickly acquire the modified element.

The database repository 806 may include any service that allows for the deposit and retrieval of electronic files. For example, the database repository 806 may be an electronic drop box, email service, or another cloud-based technology that allows electronic file sharing.

As shown by FIG. 8, the system can utilize cloud hosting (i.e., the database can include one or more cloud based servers). This type of cloud hosting allows for flexibility and scalability. New instances of servers can be created quickly and efficiently to ensure the system scales the use of the application as adoption rates increase. Thus, embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
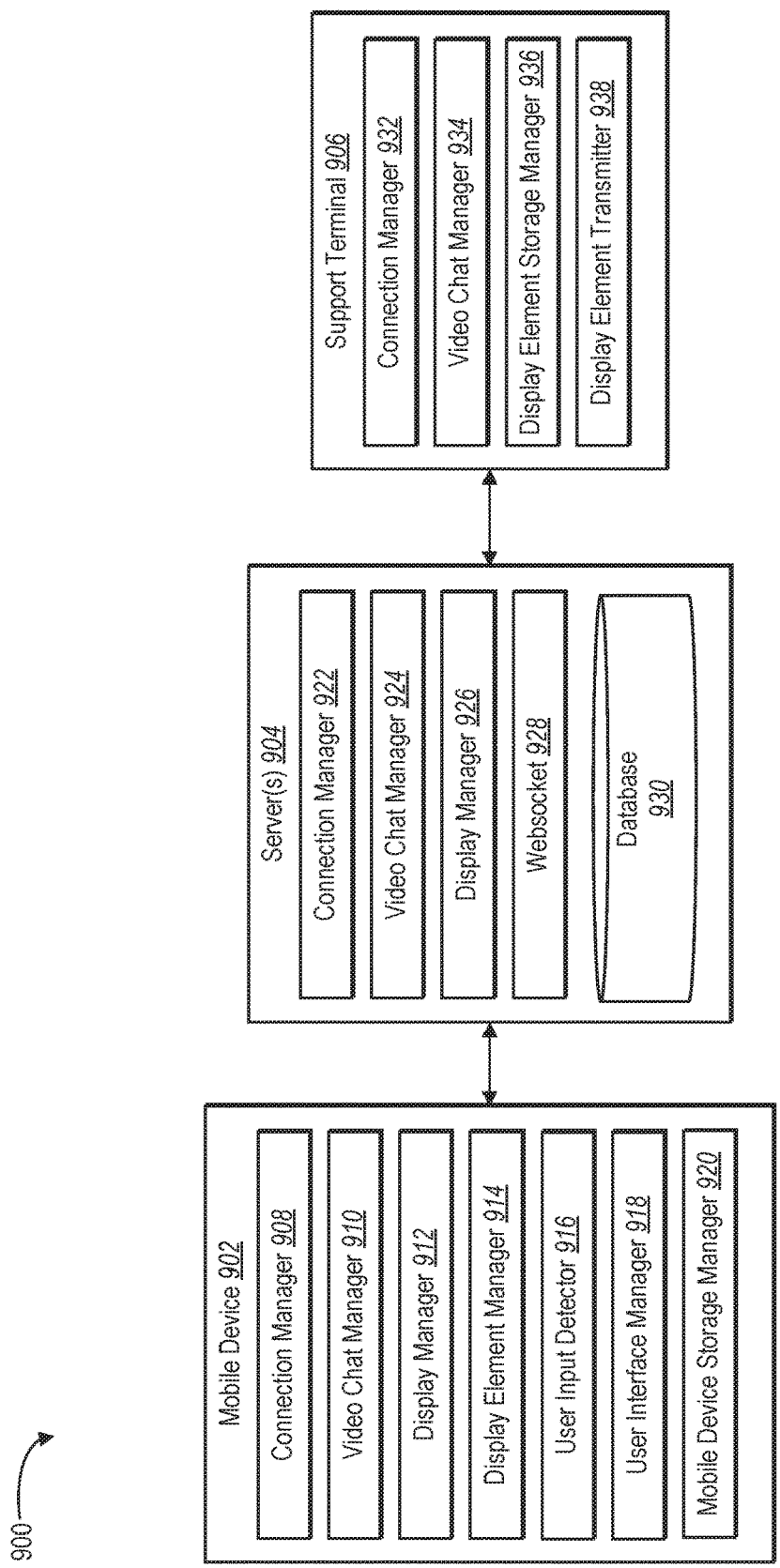
FIG. 9 illustrates a schematic diagram of a communications system in accordance with one or more embodiments.

Turning now to FIG. 9, additional detail will be provided regarding components and capabilities of one embodiment of the present invention comprising the communications system 100 as well as the communications system 800. In particular, FIG. 9 illustrates an embodiment of an exemplary system 900. As shown, the system 900 may include, but is not limited to, a mobile device 902, a server system 904, and a support terminal 906. Moreover, as shown, the mobile device 902 includes, but is not limited to, a connection manager 908, a video chat manager 910, a display manager 912, a display element manager 914, a user input detector 916, a user interface manager 918, and a mobile device storage manager 920. Additionally, as shown in FIG. 9, the server system 904 includes, but is not limited to, a connection manager 922, a video chat manager 924, a display manager 926, a WebSocket 928, and a database 930. Furthermore, as shown in FIG. 9, the support terminal 906 includes, but is not limited to, a connection manager 932, a video chat manager 934, a display element storage manager 936, and a display element transmitter 938.

As just mentioned, and as illustrated in FIG. 9, the mobile device 902 includes the connection manager 908. The connection manager 908 searches for, detects, identifies, accepts, establishes, monitors, and maintains various types of connections. In particular, the connection manager 908 establishes and maintains one or more connections between the mobile device 902 and another device, such as the support terminal 906. For example, when establishing a video chat between the mobile device 902 and the support terminal 906, the connection manager 908 will establish and maintain a peer-to-peer connection through the duration of a video chat session.

As mentioned, and as illustrated in FIG. 9, the mobile device 902 also includes the video chat manager 910. The video chat manager 910 initiates, provides for display, and maintains a video chat between the mobile device 902 and another device, such as the support terminal 906. In particular, the video chat manager 910 operates in conjunction with the connection manager 908 to establish and maintain a video chat between the mobile device 902 and another device, such as a support terminal 906. Additionally, the video chat manager 910 operates in conjunction with any number of user input/output devices, including, but not limited to cameras, microphones, display screens, touchscreens, and keypads.

As mentioned, and as illustrated in FIG. 9, the mobile device 902 also includes the display manager 912. The display manager 912 maintains and changes a display presented on the mobile device 902. In particular, the display manager 912 works in conjunction with the user input detector 916 to change a display of the mobile device in response to detecting a user interaction. Additionally, the display manager 912 works in conjunction with the user interface manager 918 to display a graphical user interface.

The display manager 912 also changes the display of the mobile device 902 in response to receiving triggering code through a connection to another device. For example, the display manager 912 may receive triggering code over a connection. In response to receiving the triggering code, the display manager 912 can divide the display of the mobile device 902 into multiple panes, enabling the mobile device 902 to display multiple display items within the multiple panes. As referred to herein, a "display item" refers to any visual component (e.g. character, image, video, or user interface) For example, the mobile device 902 may be able to display separate mobile applications in the multiple panes or the mobile device may display a video chat in one pane and a display element in another.

Additionally, the display manager 912 may modify the size of the multiple panes according to the needs of the items displayed in those panes. In particular, the display manager 912 may increase the size of a pane if the display item within the pane requires more display space.

As mentioned, and as illustrated in FIG. 9, the mobile device 902 also includes the display element manager 914. The display element manager 914 receives, sends, and provides for display elements. In particular, the display element manager operates in conjunction with the display manager 912 to display a display element on the mobile device 902. In one or more embodiments, the display manager 912 displays one or more authentication element within or in association with a display element. Additionally, the display element manager 914 modifies and maintains display elements. In particular, the display element manager operates in conjunction with the user input detector 916 to detect a user input. In response to detecting a user input, the display element manager 914 modifies the display element in accordance with the particular user interaction.

As just mentioned, and as illustrated in FIG. 9, the mobile device 902 also includes the user input detector 916. The user input detector 916 detects, identifies, monitors, receives, processes, captures, and/or records various types of user input. For example, the user input detector 916 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 916 operates in conjunction with any number of user input devices (in isolation or in combination), mouse devices, keyboards, track pads, or stylus devices. The user input detector 916 detects and identifies various types of user interactions with user input devices, such as select events, drag events, scroll events, and so forth. For example, the user input detector 916 detects one or more touch gestures (e.g., swipe gestures, tap gestures, pinch gestures, or reverse pinch gestures) from a user that forms a user interaction.

The user input detector 916 communicates with, and thus detects user input with respect to, a variety of programs, applications, plug-ins, operating systems, user interfaces, or other implementations in software or hardware.

As mentioned, and as illustrated in FIG. 9, the mobile device 902 also includes the user interface manager 918. The user interface manager 918 provides, manages, and/or controls a graphical user interface (or simply "user interface") for use with the system 900. In particular, the user interface manager 918 can facilitate presentation of information by way of an external component of the mobile device 902. For example, the user interface manager 918 can display a user interface by way of a display screen associated with the mobile device 902. The user interface may be composed of a plurality of graphical components, objects, and/or elements that allow a user to perform a function. The user interface manager 918 presents, via the mobile device 902, a variety of types of information, including text, images, video, audio, characters, or other information. Moreover, the user interface manager 918 provides a variety of user interfaces specific to any variety of functions, programs, applications, plug-ins, devices, operating systems, and/or components of the mobile device 902.

The user interface manager 918 can provide a user interface with regard to a variety of operations or applications. For example, the user interface manager 918 provides a user interface that facilitates selecting, identifying, searching, or downloading digital files. Similarly, the user interface manager 918 can generate a user interface that facilitates managing, editing, modifying, downloading, uploading, or sending digital images. Additional details with respect to various example user interface elements are described throughout with regard to various embodiments containing user interfaces.

In addition, as illustrated in FIG. 9, the mobile device 902 also includes the mobile device storage manager 920. The mobile device storage manager 920 maintains data for the system 900. The mobile device storage manager 920 can maintain data of any type, size, or kind, as necessary to perform the functions of the system 900.

Furthermore, as illustrated in FIG. 9, the server system 904 includes the connection manager 922. The connection manager 922 searches for, detects, identifies, accepts, establishes, monitors, and maintains various types of connections. In particular, the connection manager 922 establishes and maintains one or more connections between devices. For example, the connection manager 922 may establish a connection between the mobile device 902 and the support terminal 906.

As mentioned, and as illustrated in FIG. 9, the server system 904 also includes the video chat manager 924. The video chat manager 924 establishes, receives, transmits, and maintains a video chat between multiple devices. For example, the video chat manager 924 may establish and maintain a video chat between the mobile device 902 and another device, such as the support terminal 906. In particular, the video chat manager 924 operates in conjunction with the connection manager 922 to establish and maintain a video chat across a connection maintained by server system 904.

As mentioned, and as illustrated in FIG. 9, the server system 904 also includes the display manager 926. The display manager 926 receives and transmits items for display on devices. In particular, the display manager 926 can transmit items sent from one device to another device. For example, the display manager 926 can transmit a display element sent from the support terminal 906 to be displayed on the mobile device 902.

As mentioned, and as illustrated in FIG. 9, the server system 904 also includes the WebSocket 928. The WebSocket 928 is a bi-directional communication module that enables a device acting as a server to push data to a client device, rather than waiting for the client device to send a request for data, which the server then fills. In particular, the WebSocket 928 operates in conjunction with the display manager 926 to enable a device acting as a server to push items for display to a device acting as a client. For example, the WebSocket 928 and the display manager 926 work in conjunction to enable the support terminal 906 to push a display element for display to the mobile device 902.

As mentioned, and as illustrated in FIG. 9, the server system 904 also includes the database 930. The database 930 operates as a database repository to store data for retrieval. The database 930 can operate as an electronic cloud storage system (e.g. an electronic drop box). In particular, the database 930 stores data for retrieval from a device. For example, the database 930 can store a modified display element received from the mobile device 902 until it is overwritten or retrieved by the support terminal 906.

Furthermore, as illustrated in FIG. 9, the support terminal 906 includes the connection manager 932. The connection manager 932 searches for, detects, identifies, accepts, establishes, monitors, and maintains various types of connections. In particular, the connection manager 932 establishes and maintains one or more connections between the support terminal 906 and another device, such as the mobile device 902. For example, when establishing a video chat between the mobile device 902 and the support terminal 906, the connection manager 932 will establish and maintain a peer-to-peer connection through the duration of the video chat session.

As mentioned, and as illustrated in FIG. 9, the support terminal 906 also includes the video chat manager 934. The video chat manager 934 initiates, provides for display, and maintains a video chat between the support terminal and another device, such as the mobile device 902. In particular, the video chat manager 934 operates in conjunction with the connection manager 932 to establish and maintain a video chat between the support terminal 906 and another device, such as a mobile device 902. Additionally, the video chat manager 934 operates in conjunction with any number of user input/output devices, including, but not limited to cameras, microphones, display screens, touchscreens, and keypads.

Further, the video chat manager 934 can facilitate a virtual support representative, as descried above. For instance, the video chat manager 934 provides a virtual support representative to the mobile device 902 during a video chat. In addition, the video chat manager 934 can perform operations associated with the virtual support representative, such as speech-to-text, text-to-speech, user input analytics, workflow tracking, and/or machine learning. Further, the video chat manager 934 can automatically select one or more display elements (in connection with the with the display element storage manager 936) to provide to the mobile device 902 via a connection that is separate from the video chat connection.

As mentioned, the support terminal 906 includes the display element storage manager 936. The display element storage manager 936 stores display elements that may be selected and transmitted to another device, such as the mobile device 902. In some embodiments, the display element storage manager 936 stores display elements in a set, information pipeline, workflow, knowledge base, template, decision tree, or document. In this manner, the video chat manager 934 and/or a support representative user can select one or more display elements, and the display element transmitter 938 (described below) can provide the one or more display elements to the mobile device 902. In addition, the display element storage manager 936 operates in conjunction with the display element transmitter 938 and the connection manager 932 to transmit a display element across a connection.

As mentioned, and as illustrated in FIG. 9, the support terminal 906 also includes the display element transmitter 938. The display element transmitter 938 operates to transmit a display element across a connection to another device. For instance, the display element transmitter 938 transmits one or more display elements from the support terminal 906 to the mobile device 902 via a connection that is separate from a concurrent video chat connection. In addition, the display element transmitter 938 can ensure that a transmitted display element includes instructions or a trigger to cause the mobile device 902 to display the display element in a pane separate from the video chat.

Figure 10:
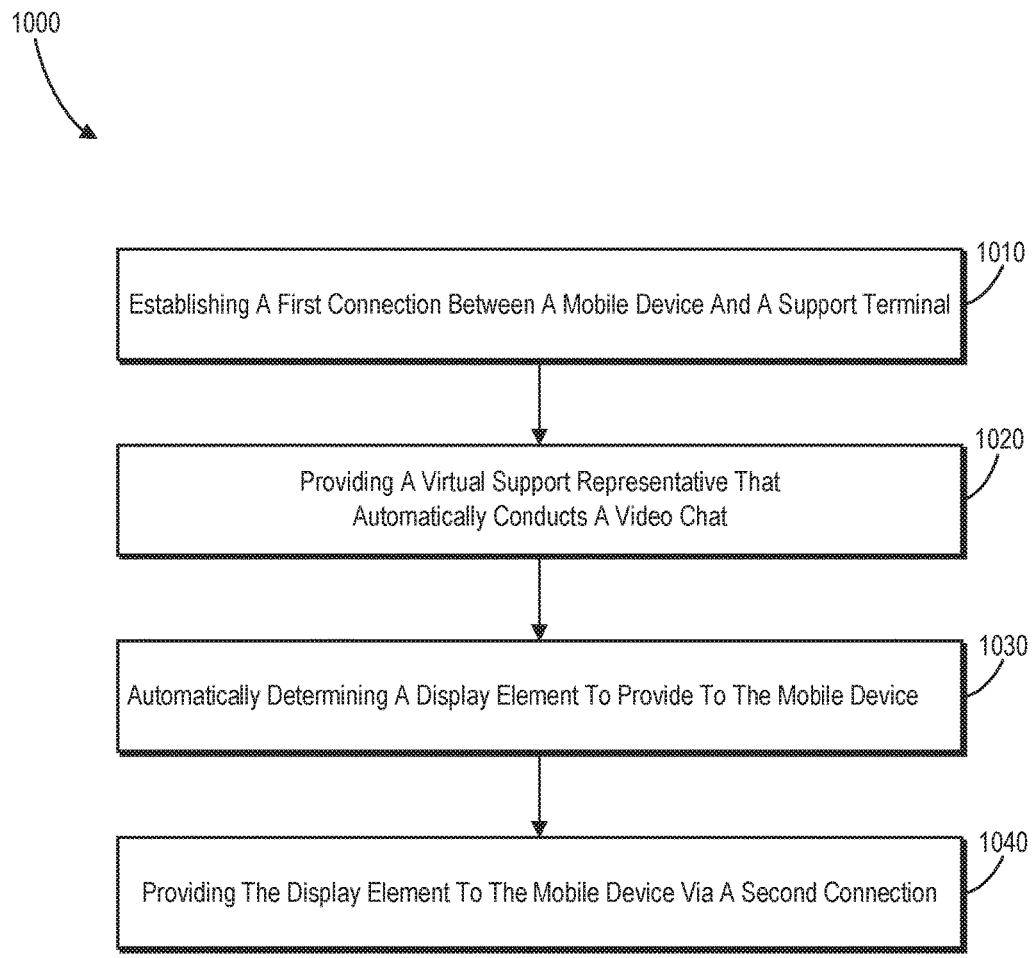
FIG. 10 illustrates a flowchart of a series of acts in a method of providing a virtual support representative in a video chat in accordance with one or more embodiments.

FIG. 10 illustrates a flowchart of a series of acts in a method 1000 of providing a virtual support representative in a video chat in accordance with one or more embodiments of the present invention. In one or more embodiments, a support terminal implements the method 1000. In some embodiments, a combination of devices, such as a mobile device, servers, and/or a support terminal implement the method 1000.

As illustrated in FIG. 10, the method 1000 can include an act 1010 of establishing a first connection between a mobile device and a support terminal. For instance, the act 1010 can include receiving a request for a video chat by a mobile device. In some embodiments, the first establishing the first connection between the mobile device and the support terminal includes establishing a peer-to-peer connection between the mobile device and the support terminal and maintaining the first connection through the peer-to-peer connection. Alternatively, establishing the first connection between the mobile device and the support terminal includes establishing a direct connection (e.g., non-peer-to-peer) between the mobile device and the support terminal. In one or more embodiments, the act 1020 also includes providing, to the mobile device, a trigger via the first connection, which causes the mobile device to execute code stored on the mobile device that activates a peripheral of the mobile device, such as a camera or a microphone.

As shown, the method 1000 also includes an act 1020 of providing a virtual support representative that automatically conducts a video chat. For instance, the act 1020 can involve providing a virtual support representative that automatically conducts a video chat with the mobile device via the first connection. In some embodiments, the act 1020 also includes maintaining a tasks transcript or log of actions performed by the virtual support representative during the video chat.

The method 1000 also includes an act 1030 of automatically determining a display element to provide to the mobile device. For example, the act 1030 can involve determining by the virtual support representative, automatically and without user intervention, a display element to provide to the mobile device. In one or more embodiments, the act 1030 includes determining the display element to provide to the mobile device is based on machine learning. In some embodiments, determining the display element to provide to the mobile device is based is based on a workflow, framework, information pipeline, knowledge base, document, or decision tree.

As shown, the method 1000 also includes an act 1040 of providing the display element to the mobile device via a second connection. The act 1040 can include providing the display element to the mobile device via a second connection during the video chat, where the display element causes the mobile device to display the video chat in a first pane and the display element in a second pane. In one or more embodiments, the act 1040 also includes providing, to the mobile device, a trigger via the second connection during the video chat, which causes the mobile device to execute code stored on the mobile device that adds the second pane. In some embodiments, the second connection is a server WebSocket connection provided by the support terminal.

In one or more embodiments, the act 1040 also includes receiving, in response to providing the display element, user input from the mobile device. In some embodiments, the user input from the mobile device includes user input entered into a fillable field displayed in the second pane of the mobile device, a signed document displayed in the second pane of the mobile device, or an accepted or rejected set of terms displayed in the second pane of the mobile device. In various embodiments, the display element is a document, a slide, a video clip, an image, or a Tillable field.

The method 1000 can include one or more additional acts. For example, in one or more embodiments, the method 1000 includes the acts of determining, based on user input received from the mobile device, to transfer the video chat from the virtual support representative to a support representative user; and transferring, from the support terminal, the video chat from the virtual support representative to the support representative user via the first connection. In some embodiments, determining to transfer the video chat from the virtual support representative to the support representative user is based on a workflow, framework, or a document constraint.

In one or more embodiments, the method 1000 includes the act of providing a tasks transcript to the support representative user upon transferring the video chat from the virtual support representative to the support representative. In various embodiments, the method 1000 includes the act of determining the support representative user from a plurality of support representative users based on one of more of availability, specialty requirements, user priority, or user rating.

In one or more embodiments, the method 1000 includes the act of training the machine learning based on the tasks transcript. In some embodiments, the method 1000 includes providing a default display element to the mobile device upon establishing the video chat via the first connection. In various embodiments, the method 1000 includes receiving user input from the mobile device via a third secured connection.

Thus, as described above, in one or more embodiments, the system is a unique combination of interactive panes on a mobile or tablet device that can be changed dynamically through a WebSocket layer that is utilized to handle real time communication actions between a second pane and the support representative user sending the changes to the second pane. Further, each second pane may change based on the action or function of a representative user interacting with a backend support center. Additionally, a first pane is continuously streaming audio and video to the mobile device during the interactions with the second pane.

Embodiments of the present disclosure may include or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 11:
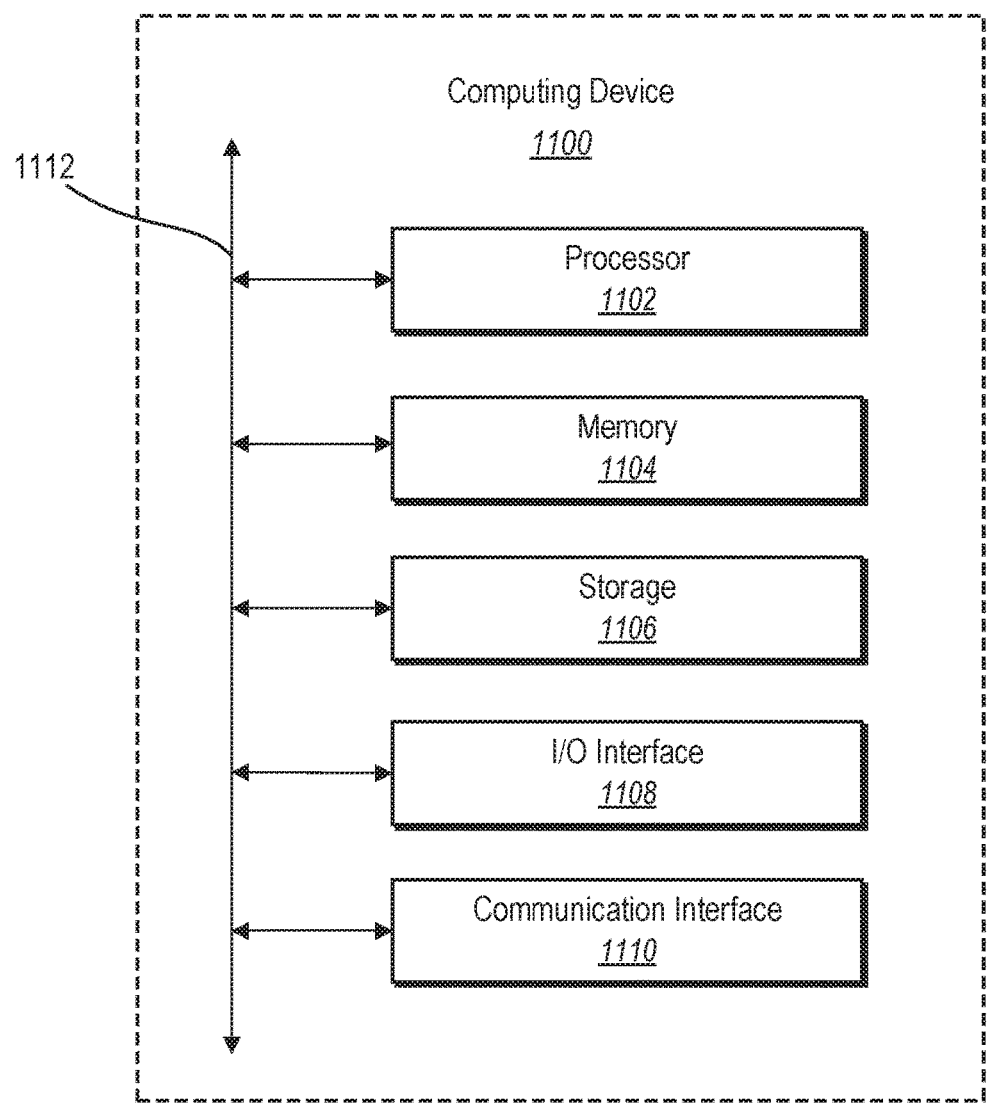
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that the systems 100, 800, 900 can include implementations of the computing device 1100. As shown by FIG. 11, the computing device 1100 can include a processor 1102, memory 1104, a storage 1106, an I/O interface 1108, and a communication interface 1110. While an exemplary computing device 1100 is shown in FIG. 11, the components illustrated in FIG. 11 are not intended to be limiting. Additional or alternative components may be used in other embodiments. Furthermore, in certain embodiments, a computing device 1100 can include fewer components than those shown in FIG. 11. Components of computing device 1100 shown in FIG. 11 will now be described in additional detail.

In particular embodiments, processor(s) 1102 includes hardware for executing instructions, such as those making up a computer program. As an example and not by way of limitation, to execute instructions, processor(s) 1102 may retrieve (or fetch) the instructions from an internal register, an internal cache, memory 1104, or a storage 1106 and decode and execute them. In particular embodiments, processor(s) 1102 may include one or more internal caches for data, instructions, or addresses. As an example and not by way of limitation, processor(s) 1102 may include one or more instruction caches, one or more data caches, and one or more translation lookaside buffers (TLBs). Instructions in the instruction caches may be copies of instructions in memory 1104 or storage 1106.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage 1106 includes storage for storing data or instructions. As an example and not by way of limitation, storage 1106 can include a non-transitory storage medium described above. The storage 1106 may include a hard disk drive (HDD), a floppy disk drive, flash memory, an optical disc, a magnetooptical disc, magnetic tape, or a Universal Serial Bus (USB) drive or a combination of two or more of these. The storage 1106 may include removable or non-removable (or fixed) media, where appropriate. The storage 1106 may be internal or external to the computing device 1100. In particular embodiments, storage 1106 is non-volatile, solid-state memory. In particular embodiments, storage 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example and not by way of limitation, communication interface 1110 may include a network interface controller (NIC) or network adapter for communicating with an Ethernet or another wire-based network or a wireless NIC (WNIC) or wireless adapter for communicating with a wireless network, such as a WI-FI.

This disclosure contemplates any suitable network and any suitable communication interface 1110. As an example and not by way of limitation, computing device 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing device 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or another suitable wireless network or a combination thereof. Computing device 1100 may include any suitable communication interface 1110 for any of these networks, where appropriate.

The computing device 1100 can further include a bus 1112. The bus 1112 can include hardware, software, or both that connects components of computing device 1100 to each other. As an example and not by way of limitation, bus 1112 may include an Accelerated Graphics Port (AGP) or another graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   establishing a first connection between a mobile device and a support terminal;
   providing a virtual support representative that automatically conducts a video chat with the mobile device via the first connection;
   determining by the virtual support representative, automatically and without user intervention, a display element to provide to the mobile device;
   providing the display element to the mobile device via a second connection during the video chat, wherein the display element causes the mobile device to display the video chat in a first pane and the display element in a second pane;
   maintaining a tasks transcript of actions performed by the virtual support representative during the video chat;
   determining to transfer the video chat from the virtual support representative to a support representative user based on applying a workflow, a framework, or an input constraint to user input received from the mobile device;
   transferring, from the support terminal, the video chat from the virtual support representative to the support representative user via the first connection; and
   providing the tasks transcript to the support representative user upon transferring the video chat from the virtual support representative to the support representative user.

2. The method of claim 1, wherein determining the display element to provide to the mobile device is based on a machine learning model.

3. The method of claim 2, further comprising training the machine learning model based on the tasks transcript.

4. The method of claim 1, further comprising determining the support representative user from a plurality of support representative users based on one or more of availability, language, specialty requirements, user priority, or user rating.

5. The method of claim 1, further comprising providing, to the mobile device, a trigger via the first connection, which causes the mobile device to execute code stored on the mobile device that activates a peripheral of the mobile device.

6. The method of claim 1, wherein the second connection is a WebSocket server connection provided via the support terminal.

7. The method of claim 1, further comprising receiving, in response to providing the display element, user input from the mobile device.

8. The method of claim 7, wherein the user input from the mobile device comprises:
- user input entered into a fillable field displayed in the second pane of the mobile device;
- a signed document displayed in the second pane of the mobile device; or
- an accepted or rejected set of terms displayed in the second pane of the mobile device.

9. The method of claim 1, wherein the display element is a document, a slide, a video clip, an image, or a Tillable field.

10. A system comprising:
- at least one processor; and
- at least one non-transitory computer readable storage medium storing instructions that, when executed by the at least one processor, cause the system to:
  - establish a first connection between a mobile device and a support terminal;
  - provide a virtual support representative that automatically conducts a video chat with the mobile device via the first connection;
  - determine by the virtual support representative, automatically and without user intervention, a display element to provide to the mobile device;
  - provide the display element to the mobile device via a second connection during the video chat, wherein the display element causes the mobile device to display the video chat in a first pane and the display element in a second pane;
  - maintain a tasks transcript of actions performed by the virtual support representative during the video chat;
  - determine to transfer the video chat from the virtual support representative to a support representative user based on applying a workflow, a framework, or a document constraint to user input received from the mobile device;
  - transfer, from the support terminal, the video chat from the virtual support representative to the support representative user via the first connection; and
  - provide the tasks transcript to the support representative user upon the transfer of the video chat from the virtual support representative to the support representative user.

11. The system of claim 10, further comprising instructions that, when executed by the at least one processor, cause the system to provide, to the mobile device, a trigger via the second connection during the video chat, which causes the mobile device to execute code stored on the mobile device that activates a camera or microphone of the mobile device.

12. The system of claim 10, further comprising instructions that, when executed by the at least one processor, cause the system to provide a default display element to the mobile device upon establishing the video chat via the first connection.

13. The system of claim 10, further comprising instructions that, when executed by the at least one processor, cause the system to receive user input from the mobile device via a third secured connection.

14. A non-transitory computer readable medium storing instructions that, when executed by at least one processor, cause a computer system to:
- establish a first connection between a mobile device and a support terminal;
- provide a virtual support representative that automatically conducts a video chat with the mobile device via the first connection;
- determine by the virtual support representative, automatically and without user intervention, a display element to provide to the mobile device;
- provide the display element to the mobile device via a second connection during the video chat, wherein the display element causes the mobile device to display the video chat in a first pane and the display element in a second pane;
- maintain a tasks transcript of actions performed by the virtual support representative during the video chat;
- determine, to transfer the video chat from the virtual support representative to a support representative user based on applying a workflow or a framework to user input received from the mobile device;
- transfer, from the support terminal, the video chat from the virtual support representative to the support representative user via the first connection; and
- provide the tasks transcript to the support representative user upon the transfer of the video chat from the virtual support representative to the support representative user.

15. The non-transitory computer readable medium of claim 14, wherein the display element is a document, a slide, a video clip, an image, or a fillable field.

16. The non-transitory computer readable medium of claim 14, further comprising instructions that, when executed by the at least one processor, cause the computer system to provide, to the mobile device, a trigger via the second connection during the video chat, which causes the mobile device to execute code stored on the mobile device that activates a camera or microphone of the mobile device.

17. The non-transitory computer readable medium of claim 14, further comprising instructions that, when executed by the at least one processor, cause the computer system to determine the display element to provide to the mobile device is based on a machine learning model.

18. The non-transitory computer readable medium of claim 14, further comprising instructions that, when executed by the at least one processor, cause the computer system to provide a default display element to the mobile device via the second connection upon establishing the video chat via the first connection.

19. The non-transitory computer readable medium of claim 14, further comprising instructions that, when executed by the at least one processor, cause the computer system to receive, in response to providing the display element, user input from the mobile device.

20. The non-transitory computer readable medium of claim 19, wherein the user input from the mobile device comprises:

user input entered into a fillable field displayed in the second pane of the mobile device;

a signed document displayed in the second pane of the mobile device; or an accepted or rejected set of terms displayed in the second pane of the mobile device.

\* \* \* \* \*